(12) United States Patent
Tomobuchi et al.

(10) Patent No.: US 9,243,683 B2
(45) Date of Patent: Jan. 26, 2016

(54) TOOTHED BELT

(71) Applicant: Tsubakimoto Chain Co., Osaka (JP)

(72) Inventors: Masato Tomobuchi, Osaka (JP);
Hideyuki Sato, Osaka (JP); Masaru Kanamori, Osaka (JP); Shoichiro Shimizu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 173 days.

(21) Appl. No.: 14/158,257

(22) Filed: Jan. 17, 2014

(65) Prior Publication Data

US 2014/0206487 A1 Jul. 24, 2014

(30) Foreign Application Priority Data

Jan. 22, 2013 (JP) ................. 2013-009236

(51) Int. Cl.
| | |
|---|---|
| *F16H 55/30* | (2006.01) |
| *C08G 63/20* | (2006.01) |
| *C08K 5/10* | (2006.01) |
| *C08K 5/11* | (2006.01) |
| *F16G 1/10* | (2006.01) |
| *C08K 3/00* | (2006.01) |
| *F16G 1/28* | (2006.01) |
| *C08L 15/00* | (2006.01) |

(52) U.S. Cl.
CPC ... *F16G 1/10* (2013.01); *C08K 3/00* (2013.01); *F16G 1/28* (2013.01); *C08L 15/005* (2013.01)

(58) Field of Classification Search
CPC .......... C08K 5/11; C08K 5/12; C08K 5/0016; C08C 19/02; C08L 9/02; C08L 2666/04
USPC ......... 474/152; 524/311, 314; 525/329.3, 338
See application file for complete search history.

(56) References Cited

U.S. PATENT DOCUMENTS

| | | | | |
|---|---|---|---|---|
| 5,055,519 A * | 10/1991 | Ono | ...................... | C08L 19/006 525/71 |
| 5,502,095 A * | 3/1996 | Ueshima | ................. | C08L 67/02 524/267 |
| 5,550,190 A * | 8/1996 | Hasegawa | ............. | C08L 67/025 525/173 |
| 6,220,983 B1 * | 4/2001 | Osako | ...................... | D02G 3/18 474/205 |
| 7,288,323 B2 * | 10/2007 | Grabau | ................... | B32B 25/10 428/461 |

(Continued)

FOREIGN PATENT DOCUMENTS

| | | |
|---|---|---|
| JP | 2002069240 A | 3/2002 |
| JP | 2008-156806 A | 7/2008 |

(Continued)

*Primary Examiner* — Henry Liu
(74) *Attorney, Agent, or Firm* — Bret E. Field; Bozicevic, Field & Francis LLP

(57) ABSTRACT

A toothed belt is provided that has excellent environment resistance, high load resistance, high stiffness, and achieves high accuracy, light weight, compactness and low noise.

A toothed belt is provided with a belt body including a plurality of core wires juxtaposed in the width direction of a rubber portion, a plurality of tooth rubber portions formed on one surface of the belt body, and a tooth cloth covering the surface of the tooth rubber portions. The rubber portion contains dioctyl sebacate and trimellitic acid ester in a mass part ratio of 1:19 to 1:1, the mass percentage of the dioctyl sebacate to the whole quantity of the rubber portion is less than 4 mass %, and the mass percentage of the total quantity of the dioctyl sebacate and the trimellitic acid ester to the whole quantity of the rubber portion is in a range from 4 mass % to 8 mass %.

20 Claims, 30 Drawing Sheets

(56) References Cited

U.S. PATENT DOCUMENTS

| | | | | |
|---|---|---|---|---|
| 7,435,198 B2* | 10/2008 | Tomobuchi | F16G 1/28 | 428/421 |
| 7,976,955 B2* | 7/2011 | Grabau | B32B 25/10 | 428/457 |
| 7,977,399 B2* | 7/2011 | Hasegawa | C08F 299/00 | 522/109 |
| 8,389,630 B2* | 3/2013 | Tamai | C08F 299/00 | 525/107 |
| 2005/0107548 A1* | 5/2005 | Grabau | B32B 25/10 | 525/331.9 |
| 2006/0063627 A1* | 3/2006 | Tomobuchi | F16G 1/28 | 474/205 |
| 2008/0048145 A1* | 2/2008 | Grabau | B32B 25/10 | 251/335.2 |
| 2008/0051517 A1* | 2/2008 | Okai | C08L 33/08 | 525/227 |
| 2008/0234426 A1* | 9/2008 | Kotani | C08F 8/42 | 524/588 |
| 2009/0186977 A1* | 7/2009 | Nagamori | C08K 3/36 | 524/556 |
| 2009/0192265 A1* | 7/2009 | Hasegawa | C08L 43/04 | 525/101 |
| 2009/0234054 A1* | 9/2009 | Nagamori | C08K 5/098 | 524/263 |
| 2009/0234072 A1* | 9/2009 | Nakagawa | C09K 3/10 | 525/100 |
| 2010/0105798 A1* | 4/2010 | Hasegawa | C08F 299/00 | 522/99 |
| 2010/0143598 A1* | 6/2010 | Wood | C08L 21/00 | 427/389.9 |
| 2010/0222520 A1* | 9/2010 | Tamai | C08F 8/14 | 525/329.5 |
| 2010/0227949 A1* | 9/2010 | Tamai | C08F 299/00 | 523/400 |
| 2010/0247787 A1* | 9/2010 | Wood | C08L 21/00 | 427/389.9 |
| 2011/0201750 A1* | 8/2011 | Harrington | C08K 5/0016 | 524/565 |
| 2011/0237374 A1* | 9/2011 | Nakao | C08K 5/098 | 474/205 |
| 2012/0295047 A1* | 11/2012 | Obrecht | C08K 5/14 | 428/36.9 |
| 2013/0029069 A1* | 1/2013 | Soddemann | C08L 9/02 | 428/35.7 |

FOREIGN PATENT DOCUMENTS

| | | |
|---|---|---|
| JP | 2008-164167 A | 7/2008 |
| JP | 4360993 B2 | 11/2011 |
| JP | 5116791 B2 | 1/2013 |
| WO | WO 2010/047121 A1 | 4/2010 |
| WO | WO 2012/161141 | 11/2012 |

\* cited by examiner

FIG. 3A
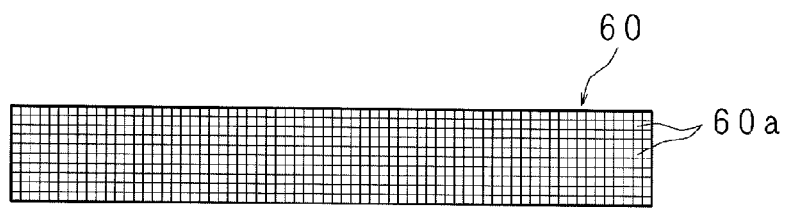
FIG. 3B
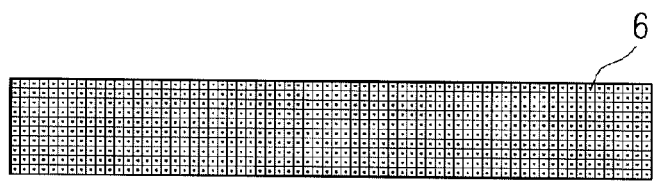
FIG. 3C
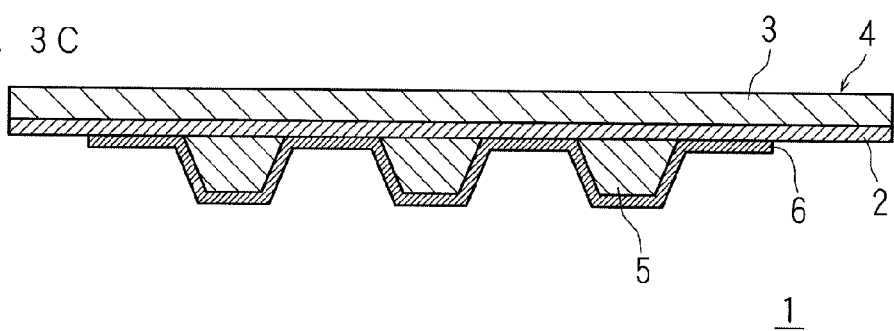

F I G. 1 0
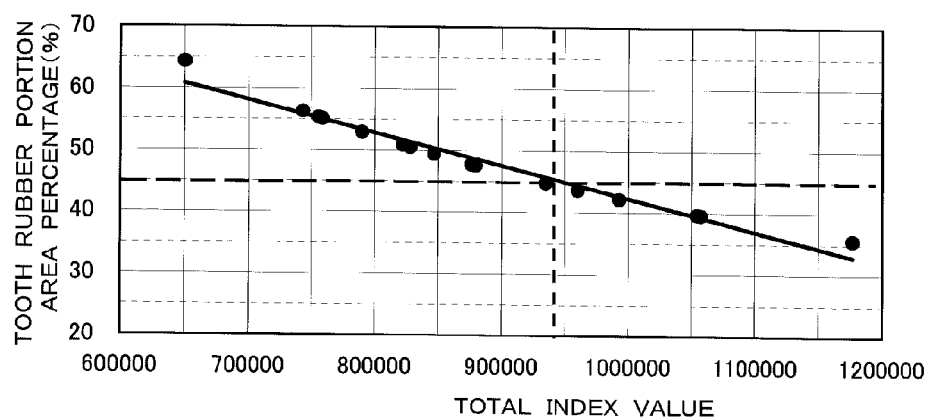

F I G. 1 1
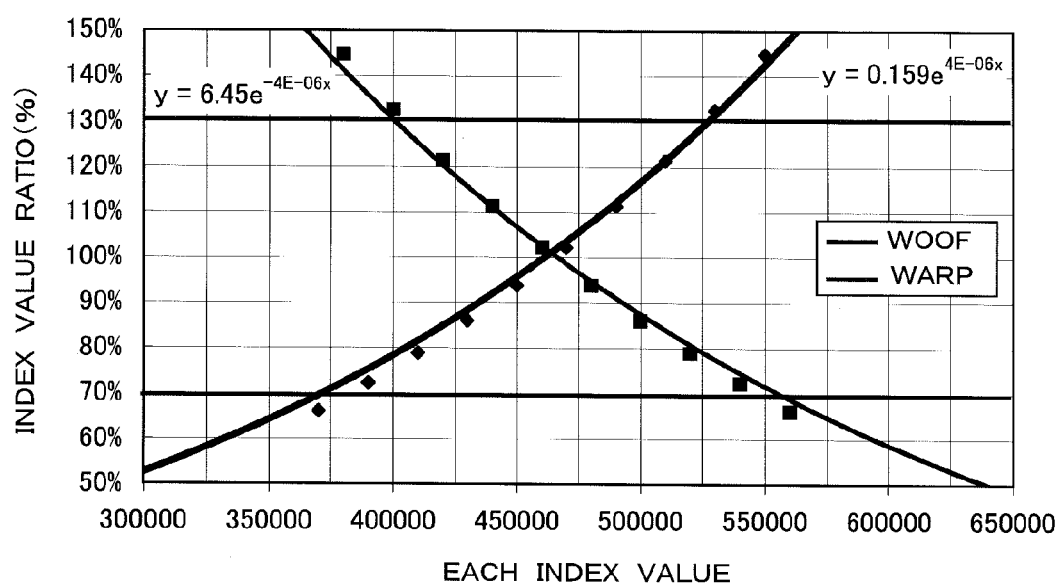

F I G. 1 3
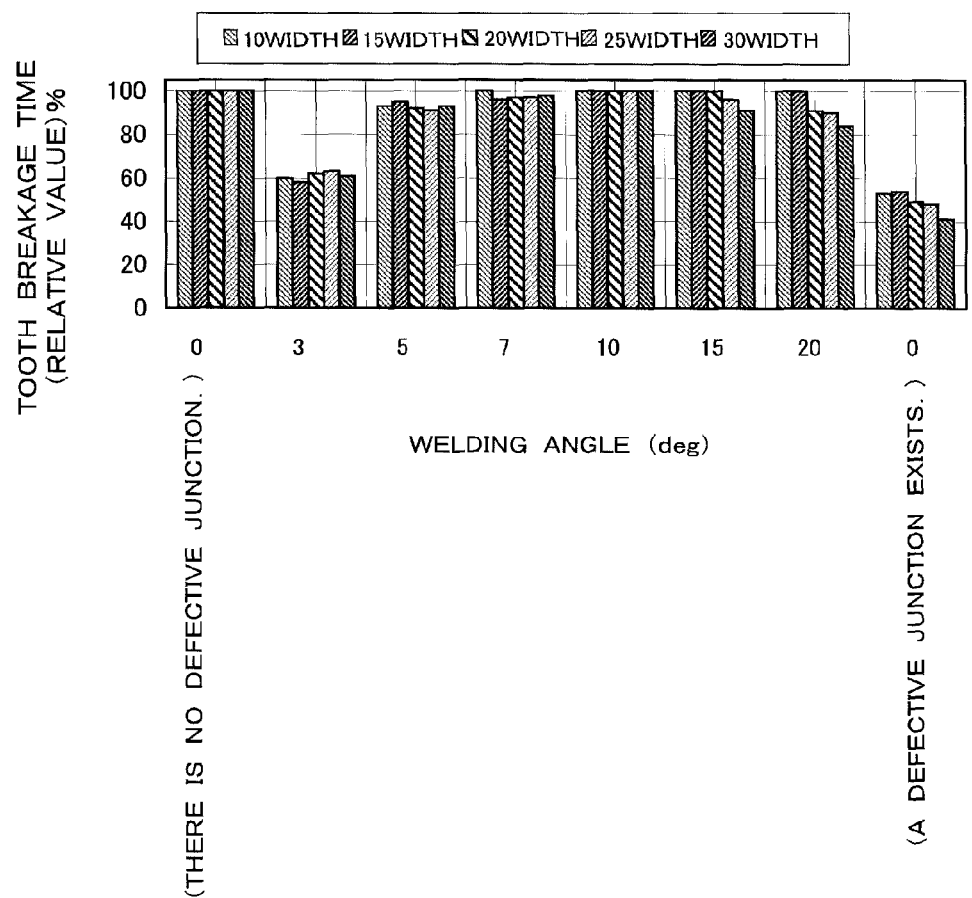

F I G. 1 7
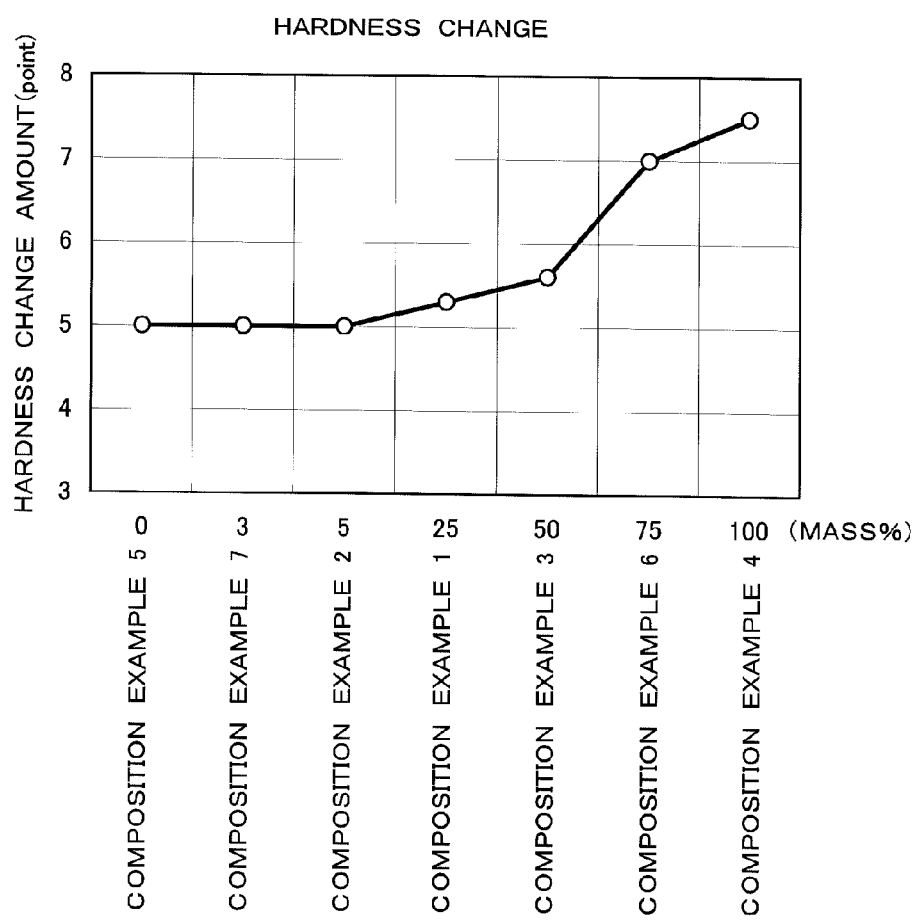

F I G. 20
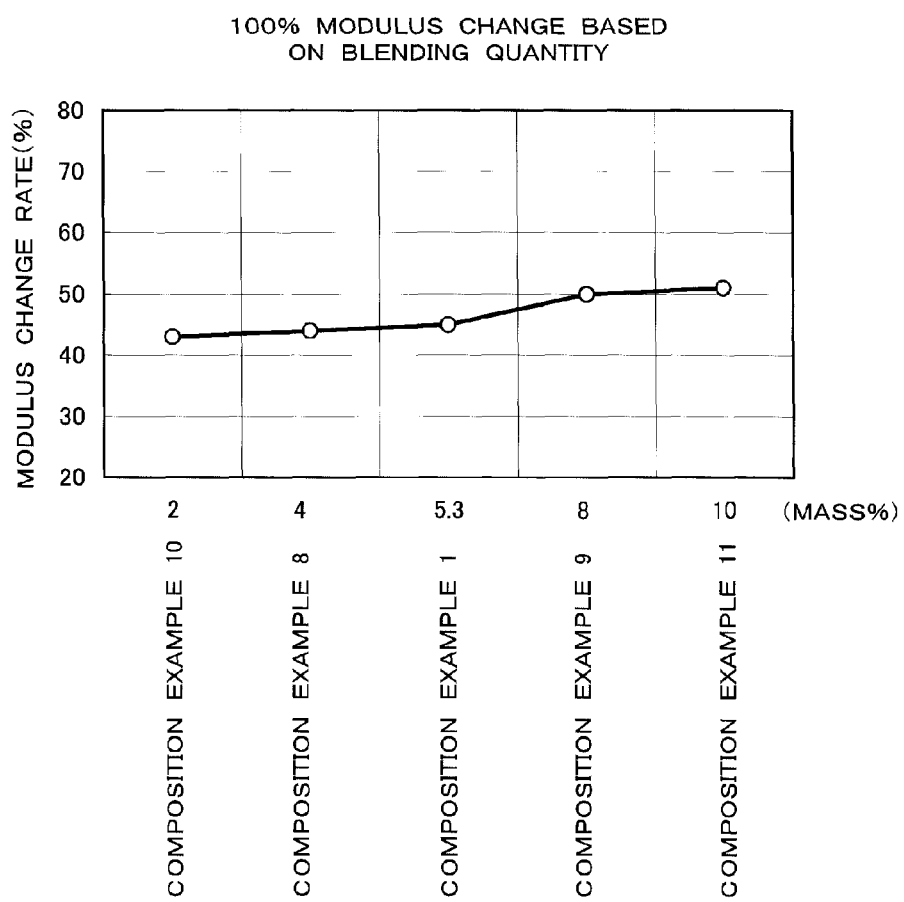

F I G. 2 7
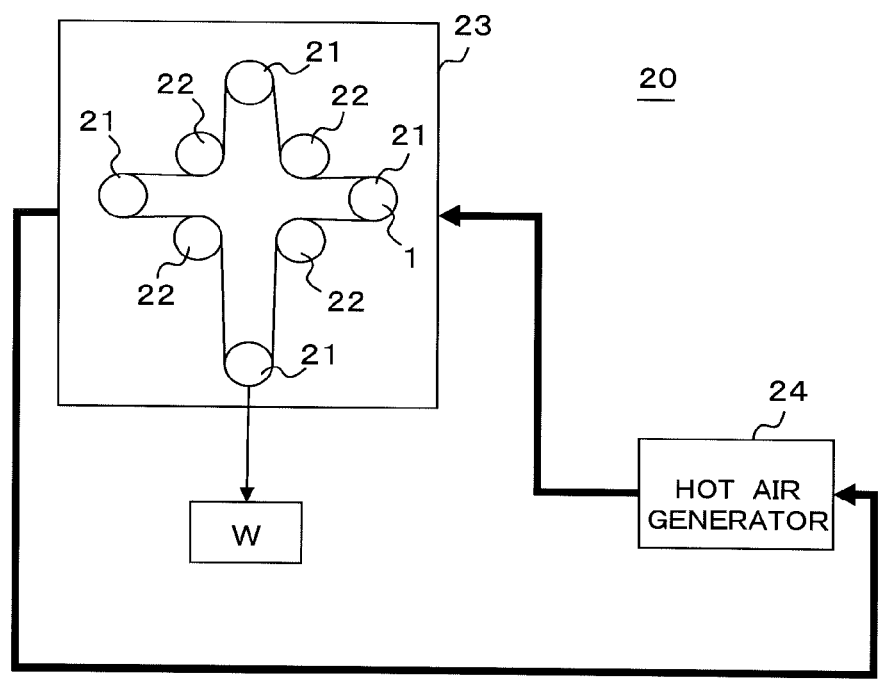

TOOTHED BELT

CROSS-REFERENCE TO RELATED APPLICATIONS

This Nonprovisional application claims priority under 35 U.S.C. §119(a) on Patent Application No. 2013-9236 filed in Japan on Jan. 22, 2013, the entire contents of which are hereby incorporated by reference.

BACKGROUND

1. Technical Field

The present invention relates to a toothed belt that has high stiffness, excellent high load resistance, and environment resistance such as heat resistance and cold resistance, and achieves high accuracy, compactness and low noise.

2. Description of Related Art

The toothed belt is wound between a driving toothed pulley and a driven toothed pulley, and is used, for example, as a power transmission belt for general industrial apparatuses and OA apparatuses, a timing belt for vehicle internal combustion engines, and a driving belt for bicycles. The toothed belt is normally constituted by a belt body formed of a black rubber portion containing carbon black embedded with a plurality of core wires extending in the direction of the length, a plurality of tooth rubber portions formed on a surface of the belt body, and tooth cloth portion covering the surface of the tooth rubber portions. The toothed belt becomes unusable in occasions such as when tooth breakage occurs mainly because of tooth cloth wear or when a core wire breaks.

To improve the transmission capacity, the stopping accuracy and the attenuation characteristic of the toothed belt, it is essential to enhance the strength, the stiffness, the wear resistance, the bending fatigue resistance and the adhesiveness, to other materials, of the rubber portion. Japanese Patent No. 4,360,993 discloses an invention of a toothed belt where the strength, the stiffness and the wear resistance of the rubber portion are enhanced by blending, as a constituent of the rubber portion, a polymer alloy in which zinc methacrylate is finely dispersed in hydrogenated nitrile rubber (HNBR).

Moreover, to improve the transmission capacity of the toothed belt, it is essential to improve the wear resistance and the adhesiveness, to the rubber portion and the core wires, of the canvas for the belt tooth cloth.

Further, to improve the transmission capacity, the stopping accuracy and the attenuation characteristic of the toothed belt, it is also essential to enhance the strength, the stiffness, the bending fatigue resistance and the adhesiveness, to other materials, of the core wires.

Japanese Patent No. 5,116,791 discloses an invention of a toothed belt having high stiffness and high strength and further, having excellent bending fatigue resistance since the rubber portion contains a hydrogenated nitrile rubber the Mooney viscosity (1+4) 100 deg C. of which is not less than 100 and not more than 160.

The above-described toothed belts of Japanese Patent No. 4,360,993 and Japanese Patent No. 5,116,791 are mainly for general industry, and are unsuited for use as a toothed belt for uses in vehicles which is used, for example, in an engine room, is a small pitch toothed belt having a tooth pitch of not more than 3 mm, and requires environment resistance, high load resistance (compactness), high accuracy, light weight and low noise.

For a small pitch toothed belt, as a rubber constituent of the rubber portion, CR (chloroprene), EPDM (ethylene-propylene-diene rubber) or the like is frequently used, and for use under low load, the rubber hardness Hs of the rubber portion is 72 to 83 and the 100% modulus at a vulcanized rubber test is 3 to 6 MPa, which indicates that stiffness is insufficient for achieving compactness.

As for the service temperature of the small pitch toothed belt, the upper limit is normally 80 deg C., in particular, 120 deg C. in the case of EPDM, and the lower limit is normally −15 to 20 deg C., in particular, −40 deg C. in the case of EPDM. In the conventional small pitch toothed belt, when heat resistance and oil resistance are satisfied, cold resistance is insufficient, when cold resistance is satisfied, oil resistance or heat resistance is insufficient, and when water resistance is satisfied, durability and dimension stability are insufficient. As for environment resistance, although belts tailored to a specific required physical property have conventionally been present, properties other than the specific property are apt to be low. Particularly, in the case of EPDM, oil resistance is insufficient. In the case of the EPS (electric power steering), scattering of grease from a ball screw occurs.

When the rubber portion contains CR and EPDM, from the viewpoint of strength, workability and moldability, it is difficult to realize high stiffness which leads to compactness.

In the conventional small pitch toothed belt, bending fatigue resistance and wear resistance are insufficient, permanent deformation is large, cracks are readily caused in the back rubber and the tooth portions, and tooth breakage readily occurs.

Moreover, in the conventional small pitch toothed belt, since glass core wires having a small diameter and a low modulus of elasticity are used, rubber stiffness is low and this increases the belt width, so that low noise is difficult to achieve. For example, in the case of a timing belt for the EPS, although the tooth pitch is 2 to 3 mm with the intension of achieving low noise, since the belt width is 25 to 34 mm, considerable space is required, and noise is caused as a result. When helical teeth are adopted, although low noise is achieved, the side surfaces of the belt are shaved because of a significant reduction in dynamic tooth jumping torque and an increase in side thrust, and durability is significantly low because of the occurrence of uneven wear of the tooth cloth or the like.

As for the original yarn of the core wires, since a thin core wire made of E glass is mainly used, strength, bending fatigue resistance and stiffness are insufficient, so that it is difficult to achieve high compactness. Although use of a high strength glass is considered, the increase in strength is 30% at the most. In addition, since an RFL treatment is performed, permanent elongation, heat resistance and water resistance are insufficient, and environment resistance is insufficient.

In the case of the small pitch toothed belt, since the tooth portions are small, the original canvas for tooth cloth is thin, so that strength is insufficient (particularly, the woof). When strength is ensured by using thick cloth, moldability is poor (the belt tooth portions are mostly cloth), so that durability is insufficient.

When the RFL treatment or a mucilage treatment using a mucilage containing carbon is performed as the treatment of the tooth cloth, friction is high, and the surface is shaved by scattered carbon shreds to reduce wear resistance. The RFL treatment is a treatment performed by using an RFL liquid formed by causing a condensation reaction between resorcinol and formaldehyde under alkaline environment and adding formalin latex or the like thereto to cause a reaction.

When the tooth portions of the belt are covered with the tooth cloth, it is preferable that the junction (joint, seam) be at a tooth tip; however, when the tooth pitch is not more than 3 mm, since the teeth are too small, it is difficult to situate the junction of the cloth at a tooth tip. The junction is shifted by the degree of linearity of the junction of the tooth cloth, a twist caused when the core wires are wound, and the like. Therefore, currently, a sewing machine and welding are used for joining, and formation into a belt is performed without specific consideration given to the position of the seam (this hardly causes a problem since the belt is used under low load). However, in the case of joining by a sewing machine, the back rubber sometimes oozes out to the tooth side surfaces through the needle holes to cause an unusual noise, and in the case of welding, a molding defect (the welded junction is entangled, so that the entire surface of the belt tooth is cloth) sometimes occurs at the junction.

SUMMARY

The present invention is made in view of such circumstances, and an object thereof is to provide a toothed belt that has excellent environment resistance such as heat resistance and cold resistance, high load resistance and high stiffness, and achieves high accuracy, light weight, compactness and low noise.

A toothed belt according to the present invention is provided with: a belt body formed of a rubber portion containing hydrogenated nitrile rubber and a polymer alloy formed by dispersing zinc methacrylate in the hydrogenated nitrile rubber, and in which a plurality of core wires are embedded; a tooth rubber portion more than one of which is juxtaposed on at least one surface of the belt body; and a tooth cloth portion formed by impregnating a cloth with a rubber composition containing hydrogenated nitrile rubber, and covering the tooth rubber portion. In the toothed belt, the rubber portion contains dioctyl sebacate and trimellitic acid ester in a mass part ratio of 1:19 to 1:1, a mass percentage of the dioctyl sebacate to a whole quantity of the rubber portion is less than 4 mass %, and a mass percentage of a total quantity of the dioctyl sebacate and the trimellitic acid ester to the whole quantity of the rubber portion is in a range from 4 mass % to 8 mass %.

In the toothed belt according to the present invention, in the hydrogenated nitrile rubber containing the hydrogenated nitrile rubber as a base polymer of the polymer alloy, a quantity of bound acrylonitrile is not more than 19 mass %, an iodine value is not more than 15 mg/100 mg, a Mooney viscosity at 100 deg C. is not less than 60, and a mass percentage of the hydrogenated nitrile rubber to the whole quantity of the rubber portion is in a range from 15 mass % to 50 mass %.

In the toothed belt according to the present invention, the rubber portion contains a hydrogenated nitrile rubber whose Mooney viscosity at 100 deg C. is not less than 100, in a range from 3 mass % to 20 mass % to the whole quantity of the rubber portion.

In the toothed belt according to the present invention, the rubber portion contains sulfur and a sulfenamide vulcanization accelerator in a mass part ratio of 1:10 to 1:2, and a mass percentage of a total quantity of the sulfur and the sulfenamide vulcanization accelerator to the whole quantity of the rubber portion is in a range from 0.3 mass % to 1 mass %.

In the toothed belt according to the present invention, the rubber portion contains organic peroxide and a co-cross-linking agent in a mass part ratio of 4:1 to 20:1, and a mass percentage of a total quantity of the organic peroxide and the co-cross-linking agent to the whole quantity of the rubber portion is in a range from 4 mass % to 8 mass %.

In the toothed belt according to the present invention, the rubber portion contains a carbon black with an average particle size of not more than 70 nm in a proportion of more than 0 mass % and not more than 20 mass % to the whole quantity of the rubber portion.

In the toothed belt according to the present invention, the rubber portion contains silicon dioxide in a range from 2 mass % to 5 mass % to the whole quantity of the rubber portion.

In the toothed belt according to the present invention, the rubber portion contains wax in a range from 0.3 mass % to 2 mass % to the whole quantity of the rubber portion.

In the toothed belt according to the present invention, a woof index value of the cloth is not less than 370000, a total index value of the cloth is not more than 930000, and an index value ratio of the cloth is in a range from 70% to 130%, where the woof index value=a yarn size (dtex)×a number of twist×a number of filaments×a thread count per inch (a web density, a woof density), a warp index value=a yarn size (dtex)×a number of twist×a number of filaments×a thread count per inch (a warp density), the index value ratio=the woof index value/the warp index value (%), and the total index value=the woof index value+the warp index value.

In the toothed belt according to the present invention, a lateral tensile strength of the cloth is not less than 500 N/3 cm, and a proportion of an area of the tooth rubber portion to a total area of the tooth rubber portion and the tooth cloth portion viewed from a belt width direction is not less than 45%.

In the toothed belt according to the present invention, the rubber composition with which the cloth is impregnated contains the following: hydrogenated nitrile rubber; epichlorohydrin rubber formed of a copolymer of epichlorohydrin and ethylene oxide or a ternary copolymer where allylglycidylether is copolymerized as a third component and an allyl group is introduced into a polymer main chain in a pendant form; hydrogenated carboxylic nitrile rubber; hydrophobic silica; blocked isocyanate; and phenolic resin.

In the toothed belt according to the present invention, the core wire is formed by impregnating a carbon fiber with a treatment agent containing hydrogenated nitrile rubber, a zirconic coupling agent, hydrophobic silica, phenolic resin and potassium titanate, and drying them.

In the toothed belt according to the present invention, the tooth cloth portion is formed so that a junction is at an angle of five degrees to 15 degrees to the belt width direction.

According to the toothed belt of the present invention, the rubber portion of the belt body contains dioctyl sebacate and trimellitic acid ester in a mass part ratio of 1:19 to 1:1, the mass percentage of the dioctyl sebacate to the whole quantity of the rubber portion composition is less than 4 mass %, and the mass percentage of the total quantity of the dioctyl sebacate and the trimellitic acid ester to the whole quantity of the rubber portion is in a range from 4 mass % to 8 mass %, so that the toothed belt has a good balance of environment resistance such as heat resistance, oil resistance, cold resistance and water resistance and has excellent stiffness and high load resistance. Consequently, high accuracy, light weight, compactness and low noise are realized in the toothed belt.

The above and further objects and features will more fully be apparent from the following detailed description with accompanying drawings.

BRIEF DESCRIPTION OF THE SEVERAL VIEWS OF THE DRAWINGS

FIG. 3A is a plan view showing an original canvas;

FIG. 3B is a plan view showing a tooth cloth;

FIG. 3C is a cross-sectional view showing the toothed belt;

FIG. 10 is a graph showing the relationship between a total index value and the tooth rubber portion area percentage of the canvas;

FIG. 11 is a graph showing the relationship between each index value and the index value ratio of the canvas;

FIG. 13 is a graph showing the tooth breakage time of each belt when the tooth pitch is 2 mm;

FIG. 17 is a graph showing the relationship between the mass percentage of the DOS to the whole quantity of the plasticizer and a hardness change amount (%);

FIG. 20 is a graph showing the relationship between the mass percentage of the plasticizer to the whole quantity of the rubber portion composition and the modulus change rate (%);

FIG. 27 is a schematic view showing a device for durability evaluation;

DETAILED DESCRIPTION

Hereinafter, the present invention will be concretely described with reference to the drawings showing an embodiment thereof.

Figure 1:
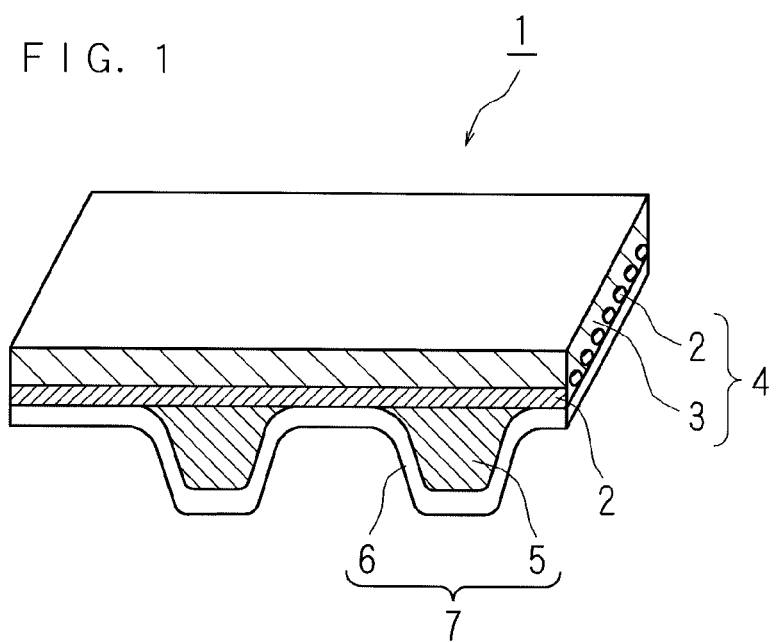
FIG. 1 is a partial cutaway perspective view showing a toothed belt according to an embodiment of the present invention.

FIG. 1 is a partial cutaway perspective view showing a toothed belt 1 according to the embodiment of the present invention.

The toothed belt 1 has a belt body 4, a tooth rubber portion 5 and a tooth cloth 6. A rubber portion 3 of the belt body 4 is embedded with a plurality of core wires 2 extending in the direction of the length of the rubber portion 3. A plurality of tooth rubber portions 5 extending in the direction of the width of the belt body 4 are formed on the surface of the belt body 4 on the side where the core wires 2 are embedded. The tooth cloth 6 is provided so as to cover the surface of the tooth rubber portions 5. A tooth portion 7 is constituted by the tooth rubber portion 5 and the tooth cloth 6. The toothed belt 1 may be such that the tooth rubber portions 5 are formed on both surfaces of the belt body 4.

The tooth cloth 6 is formed by impregnating the original canvas with a later-described rubber composition for tooth cloth.

(1) Belt Body

The rubber portion composition forming the rubber portion 3 of the belt body 4 contains, as rubber components, hydrogenated NBR (HNBR) and an HNBR/zinc methacrylate polymer alloy (hereinafter, referred to as HNBR polymer alloy) formed by finely dispersing zinc methacrylate into the HNBR. As the HNBR polymer alloy, a prepared product may be used, or it may be prepared by finely dispersing zinc methacrylate into the HNBR at the stage of the rubber portion composition preparation. Examples of this product include "Zeoforte (trademark) ZSC4195CX" manufactured by Zeon Corporation.

Preferably, the mass percentage of the HNBR polymer alloy to the whole quantity of the rubber portion composition is not less than 30 mass % and not more than 50 mass %. In this case, the obtained toothed belt 1 has excellent stiffness and adhesiveness.

The rubber portion composition contains, as the plasticizer, dioctyl sebacate (DOS) and trimellitic acid ester (hereinafter, referred to as TMLA ester) in a mass part ratio of not less than 1 to 19 and not more than 1 to 1, the mass percentage of the DOS to the whole quantity of the rubber portion composition is less than 4 mass %, and the mass percentage of the total quantity of the DOS and the TMLA ester to the whole quantity of the rubber portion composition is not less than 4 mass % and not more than 8 mass %. In this case, the obtained toothed belt 1 has a good balance of environment resistance such as heat resistance, cold resistance and bending fatigue resistance, and has excellent high load resistance and stiffness. Examples of the TMLA ester include trimellitic acid trialkyl (C4 to C11).

Preferably, the quantity of bound acrylonitrile of the HNBR which contains HNBR as the base polymer of the HNBR polymer alloy is not more than 19 mass %, the iodine value thereof is not more than 15 mg/100 mg, the Mooney viscosity (1+4) 100 deg C. thereof at 100 deg C. is not less than 60, and the mass percentage thereof to the whole quantity of the rubber portion composition is not less than 15 mass % and not more than 50 mass %. In this case, the toothed belt 1 is excellent in oil resistance, cold resistance, stiffness and cost performance, permanent deformation never becomes worse, and tooth breakage due to insufficient elasticity never occurs. By setting the iodine value to not more than 15 mg/100 mg, heat resistance is obtained, and by setting the quantity of bound acrylonitrile to not more than 19 mass %, cold resistance is obtained.

Preferably, the rubber portion composition contains an HNBR with a Mooney viscosity (1+4) 100 deg C. of not less than 100 (hereinafter, referred to as high molecular weight HNBR) in a proportion of not less than 3 mass % and not more than 20 mass % to the whole quantity of the rubber portion composition. In this case, oozing from the toothed belt 1 to the belt teeth is suppressed, and excellent stiffness, rubber workability and moldability are provided.

The rubber portion composition further contains a cross-linking agent such as sulfur and organic peroxide, a vulcanization accelerator and a co-cross-linking agent (auxiliary cross-linking agent). As the organic peroxide, although not specifically limited, the following, for example, may be used: 1,1-di-t-butyl peroxy-3,3,5-trimethylcyclohexane, di-t-butyl peroxide, dibutylcumyl peroxide, dicumyl peroxide, 2,5-dimethyl-2,5-di-(t-butylperoxy) hexane, 2,5-dimethyl-2,5-di (t-butylperoxy)hexyne, di[(t-butylperoxy)isopropyl]benzen, or t-butylperoxyisopropyl carbonate. Examples of the vulcanization accelerator include a sulfenamide vulcanization accelerator such as N-cyclohexyl-2-benzothiazolyl sulfenamide. Examples of the co-cross-linking agent include phenylenedimaleimide (N—N'-m-phenylenedimaleimide), ethylenedimethacrylate and triallyl isocyanurate.

Preferably, the rubber portion composition contains the sulfur and the sulfenamide vulcanization accelerator in a mass part ratio of not less than 1:10 and not more than 1:2, and the mass percentage of the total quantity of the sulfur and the sulfenamide vulcanization accelerator to the whole quantity of the rubber portion composition is not less than 0.3 mass % and not more than 1 mass %. In this case, the scorch time is adjusted to suppress prevulcanization, and the heat resistance and the stiffness of the toothed belt 1 are excellent.

Preferably, the rubber portion composition contains the organic peroxide and the co-cross-linking agent in a mass part ratio of not less than 4:1 and not more than 20:1, and the mass percentage of the total quantity of the organic peroxide and the co-cross-linking agent to the whole quantity of the rubber composition is not less than 4 mass % and not more than 8 mass %. In this case, prevulcanization is suppressed, increase in permanent deformation and brittleness is suppressed, and stiffness is excellent.

Preferably, the rubber portion composition further contains silicon dioxide (silica) in a proportion of not less than 2 mass % and not more than 5 mass % to the whole quantity of the rubber portion composition. It is preferable that a hydrophobic treatment is applied to the surface of the silica. When the silica is contained in the above-mentioned range, prevulcanization is suppressed, and heat resistance and workability are excellent.

Preferably, the rubber portion composition contains wax in a proportion of not less than 0.3 mass % and not more than 2 mass % to the whole quantity of the rubber portion composition. In this case, the heat resistance and the adhesiveness of the toothed belt 1 are excellent.

In addition, the rubber portion composition may contain additives such as an antioxidant, a pigment and a colorant.

Examples of the antioxidant include an amine antioxidant and a zinc salt of 2-mercaptobenzimidazole.

Examples of the pigment and the colorant include titanium oxide, carbon, phthalocyanine blue, phthalocyanine green and carmine red.

Preferably, the carbon contains a carbon black with an average particle size of not more than 70 nm in a proportion of more than 0 mass % and not more than 20 mass % to the whole quantity of the rubber portion composition. In this case, the toothed belt 1 has excellent strength. Moreover, when the toothed belt 1 is used in an environment where it is directly exposed to ultraviolet rays, physical property reduction is suppressed.

The rubber portion composition of the present invention has the above-described composition, and the rubber portion 3 obtained by cross-linking the rubber portion composition has a rubber hardness Hs of not less than 85 and not more than 90 and a 100% modulus of not less than 7 MPa.

(2) Tooth Cloth (i) Original Canvas

The small-pitch toothed belt has conventionally been used mainly under low load as mentioned above, and the strength of the original canvas is, when the original canvas is nylon 6 or 66, approximately 450 N as the tensile strength in the lateral direction per width of 3 cm of the original cloth. In the case of the toothed belt, what significantly affects the performance of the belt as the canvas strength is the strength, in the lateral direction, of the canvas receiving a shearing force from the pulley teeth. Here, the lateral direction is a direction in which stretch occurs.

In the case of uses under severe environment like uses in vehicles and when compactness is desired, with the conventional tensile strength in the lateral direction, the required shearing force resistance and impact resistance of the belt tooth portions are difficult to obtain.

To increase the strength of the original canvas in the lateral direction, methods are considered such as increasing the woof diameter, increasing the thread count (yarn density) and changing the material to a higher strength one.

When simply the yarn diameter, the number of twist and the thread count are increased, since the tooth portions of the belt are small, a molding defect readily occurs, and it is difficult to maintain a proper area ratio between the tooth rubber portion and the tooth cloth at the tooth portions. When a high strength fiber such as aramid fiber is used, the adhesiveness to other materials is decreased, and cost increases significantly. The size and the thread count of the warp are associated with the tensile strength in the lateral direction, and when these are increased too much, stress concentration occurs, so that the strength in the lateral direction is low compared with the specifications of the woof and a problem occurs with moldability. To solve this problem, in the present invention, the material is limited to nylon 6 or nylon 66, the following indices, a woof index value, a warp index value, a index value ratio and a total index value, are provided to suppress a molding defect and optimize the proportion of the tooth rubber portion and the tooth cloth to the tooth portion, and requirements to simultaneously satisfy the required performance and the product moldability are obtained.

The woof index value=the yarn size (dtex)×the number of twist×the number of filaments×the thread count per inch (the number of yarns)

The warp index value=yarn size (dtex)×the number of twist×the number of filaments×the thread count per inch (the number of yarns)

The index value ratio=woof index value/warp index value (%)

The total index value=woof index value+warp index value

For example, when the yarn size in the lateral direction is 44 dtex, the number of twist is two, the number of filaments is 34 and the woof density is 150 per inch, the woof index value=44×2×34×150=448800.

For example, when the yarn size in the longitudinal direction is 44 dtex, the number of twist is one, the number of filaments is 34 and the warp density is 288 per inch, the warp index value=44×1×34×288=430848, the index value ratio=448800/430848=104%, and the total index value=448800+430848=879648.

From the viewpoint of uniting excellent tensile strength with an excellent tooth rubber portion area percentage described later, the woof index value is set to not less than 370000, the total index value, to not more than 930000 (the warp index value, to not more than 560000), and the index value ratio, to not less than 70% and not more than 130%.

The tensile strength in the lateral direction is set to not less than 500 N/3 cm, and the tooth height of the belt when the tooth height of the mold (a prescribed tooth height described later) is 100% is set to not less than 90%, preferably, to 100%.

Preferably, the tooth rubber portion area percentage expressed by the following expression (1) is set to not less than 45%.

The tooth rubber portion area percentage=(the area of the side surface parallel to the direction of the width of the tooth rubber portion)/(the area of the side surface parallel to the direction of the width of the tooth portion) (1)

Figure 2:
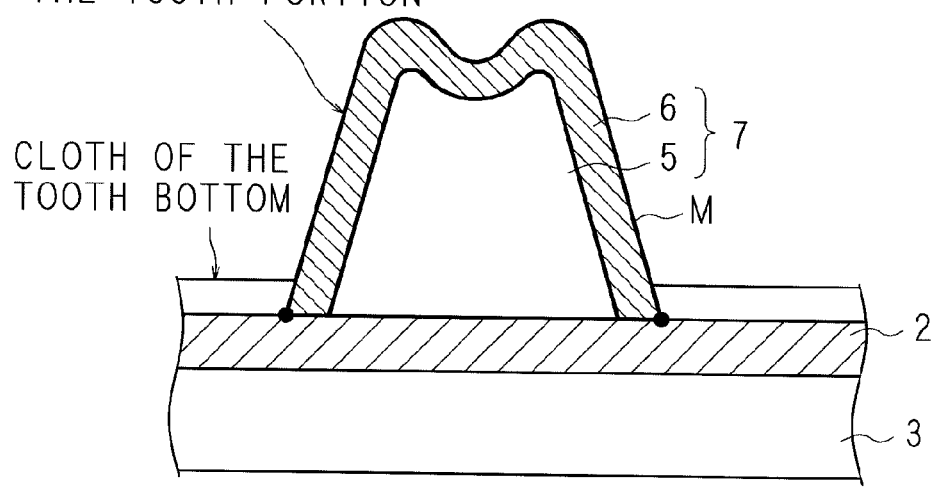
FIG. 2 is an explanatory view for explaining the tooth rubber portion area percentage.

FIG. 2 is an explanatory view for explaining the tooth rubber portion area percentage.

As shown in FIG. 2, the oblique side of the pressure surface of the tooth portion 7 is extended to the surface of the core wire 2, and the percentage of the cross-sectional area of the tooth rubber portion 5 to the thick line part M when the surface of the core wire 2 is the base is set to not less than 45%, that is, the percentage of the cross-sectional area of the tooth cloth 6 is set to not more than 55%.

When the tooth rubber portion area percentage is less than 45%, the elasticity of the tooth portion 7 is insufficient because of insufficiency of the quantity of the tooth rubber portion 5, so that tooth breakage readily occurs due to a repetitively received shearing load. When the tooth cloth 6 is too thick, the bottom of the tooth portion 7 is too thick at the same time and accordingly, the permanent deformation of the tooth cloth 6 is large, so that it is difficult to hold proper meshing and tooth breakage due to improper meshing occurs at an early stage.

The woof which forms the tooth portion 7 necessarily undergoes a wooly finish, or crimping using urethane yarns or the like to provide stretching property.

The warp is not crimped.

Examples of the weaving method include a twill weave, a plain weave and a double weave.

(ii) Tooth Cloth Treatment

Regarding the tooth cloth treatment, conventionally, by dissolving a predetermined rubber composition in an organic solvent or the like and impregnating canvas with this, the adhesiveness to the rubber portion 3 and the core wire 2 and the wear resistance to the friction with the pulley are obtained.

Moreover, as described previously, the tooth cloth is also treated by using the RFL liquid.

In the former case using the rubber composition, hard materials such as the carbon black and the metallic oxide blended in the rubber composition become powder because of the friction with the pulley, and this powder adheres to the surface of the tooth portion and promotes wear of the tooth cloth by the friction with the pulley teeth. In addition, the friction coefficient of the tooth cloth after the treatment is high.

Regarding the latter RFL treatment, although sufficient adhesiveness to the rubber and the core wires is ensured, like the rubber composition treatment, when formed into a belt, the friction coefficient of the tooth cloth after the treatment is high, so that a required wear resistance is not obtained. Since a hardened resin is formed into the tooth portions in the RFL treatment, a molding defect readily occurs on the belt.

To solve this problem, the above-mentioned Japanese Patent No. 5,116,791 discloses an invention of a toothed belt that fulfills required conductivity by lightening the color without a carbon black contained and improving wear resistance by a lubricant such as PTFE being contained. For example, the side coming in contact with the pulleys contains conductive zinc oxide and a conductive plasticizer, the adhesive layer of the surface in contact with the rubber portion contains conductive carbon, and these are brought in contact with the pulleys and grounded to the apparatus side, thereby preventing static generation.

However, it is necessary to prepare different kinds of treatment agents for both surfaces of the original canvas and the inside, the number of components blended in the treatment liquid is large, and the number of times of treatment is also large, which is disadvantageous from the viewpoint of cost, workability and production efficiency.

The present invention improves workability and production efficiency while ensuring the wear resistance of the canvas.

To provide wear resistance against high load environment and prevent unusual noise generation on the belt, a lubricant is required on the side of the surface coming in contact with the pulleys. However, many of the lubricants decrease the adhesiveness to the tooth cloth and most of them have low conductivity.

The tooth cloth treatment of the present invention is required to be performed only once by using one kind of treatment liquid (tooth cloth rubber composition), and the tooth cloth having undergone the treatment is excellent in conductivity, wear resistance, adhesiveness, water resistance and high load resistance.

The tooth cloth rubber composition is a polymer alloy in which an epichlorohydrin rubber is mixed in an HNBR rubber composition. The epichlorohydrin rubber is formed of a copolymer of epichlorohydrin and ethylene oxide or a ternary copolymer where allylglycidylether is copolymerized as a third component and an allyl group is introduced into a polymer main chain in a pendant form. Hydrogenated carboxylic nitrile rubber, hydrophobic silica, blocked isocyanate and phenolic resin are also contained. Preferably, PTFE and graphite are further contained.

Preferably, the epichlorohydrin rubber is contained in a proportion of not less than 3 mass % and not more than 18 mass % to the whole quantity of the tooth cloth rubber composition. In this case, conductivity and wear resistance are excellent.

Preferably, the tooth cloth rubber composition contains zinc methacrylate in a proportion of not less than 3 mass % and not more than 11 mass % to the whole quantity of the tooth cloth rubber composition. In this case, adhesiveness and wear resistance are excellent. A prepared product formed by finely dispersing zinc methacrylate in HNBR in advance may be used.

From the viewpoint of adhesiveness, workability and cost, it is preferable that the hydrogenated carboxylic NBR be contained in a proportion of not less than 1 mass % and not more than 6 mass %. Examples of the hydrogenated carboxylic NBR include one where the Mooney viscosity (1+4) 100 deg C. is not less than 60 and not more than 100, the quantity of bound acrylonitrile quantity is not more than 50% and the iodine value is not more than 60 mg/100 mg. By the hydrogenated carboxylic NBR being contained, the adhesiveness of the tooth cloth 6 to the core wire 2 and the rubber portion 3 is excellent. Moreover, since the RFL treatment is unnecessary and no condensation product of resorcin with formalin is contained, wear resistance is excellent.

Preferably, the hydrophobic silica is contained in a proportion of not less than 0.3 mass % and not more than 4 mass %. In this case, water property and workability are excellent, and prevulcanization is suppressed.

Preferably, the blocked isocyanate is contained in a proportion of not less than 0.15 mass % and not more than 2 mass %. In this case, adhesiveness is excellent.

Preferably, the phenolic resin is contained in a proportion of not less than 1 mass % and not more than 11 mass %. In this case, adhesiveness is excellent, and temperature dependence is low.

Preferably, the PTFE is contained in a proportion of not less than 10 mass % and not more than 28 mass %. In this case, wear resistance and adhesiveness are excellent.

Preferably, the graphite is contained in a proportion of not less than 1 mass % and not more than 7 mass %. In this case, conductivity, wear resistance and adhesiveness are excellent.

Preferably, an organic peroxide cross-linking agent such as di[(t-butylperoxy)isopropyl]benzene is contained in a proportion of not less than 1 mass % and not more than 5 mass %. In this case, wear resistance and adhesiveness are excellent, and temperature dependence is low.

Preferably, a co-cross-linking agent such as N—N'-m-phenylenedimaleimide is contained in a proportion of not less than 0.07 mass % and not more than 2 mass %. In this case, prevulcanization is suppressed, and temperature dependence is low.

Preferably, conductive zinc oxide is contained in a proportion of not less than 1 mass % and not more than 7 mass %. In this case, conductivity and wear resistance are excellent.

Preferably, potassium titanate is contained in a proportion of not less than 0.17 mass % and not more than 2 mass %. In this case, wear resistance and workability are excellent.

Preferably, the tooth cloth rubber composition contains sulfur, a vulcanization accelerator such as N-cyclohexyl-2-benzothiazolyl sulfenamide, stearic acid, magnesium oxide, ethylenethiourea and the like.

(3) Core Wire

To reduce the width of the toothed belt, it is necessary to improve the strength, bending fatigue resistance and stiffness of the core wires. In particular, it is necessary to use a material having high tensile stiffness in order to maintain proper meshing against high load environment. Conventionally, glass fibers have frequently been used as the material for the core wires as a tensile strength member of the timing belt. Although glass fibers have excellent strength, stiffness and bending fatigue resistance, they are insufficient in stiffness as the core wire material for small pitch belts for uses in vehicles.

Although it is considered to change the core material to a wire of a metal such as steel in order to obtain stiffness, in the case of a metallic core wire, bending fatigue resistance is extremely poor, and bending stiffness is great to reduce transmission efficiency. Recently, carbon fibers have been used as the core material replacing this. Although the carbon core wire has excellent stiffness, it does not have much superiority in tensile strength over glass fibers and the like when the core wire diameter is the same. Although it is considered to increase the fiber amount (increase the diameter) in order to enable width reduction, in the case of the timing belt, the diameter of the core wire and the thickness of the tooth cloth substantially determine the condition of meshing with the pulleys, and in the case of the small pitch belt, when the diameter of the core wire is increased and the belt is operated with small diameter pulleys, bending fatigue resistance cannot be ensured, so that increase in the diameter of the core wire is limited.

Therefore, it is also performed to dispose glass fibers around carbon fibers to improve strength, bending fatigue resistance, impact resistance and the adhesiveness to parts. However, the man-hours increase to increase cost. Moreover, since the quantity of carbon fibers is small when compared with a core wire of the same diameter made of only carbon, it is necessary that the diameter be large in order to obtain required stiffness. Although a core wire is available in which the stiffness of the carbon fibers is enhanced by performing the RFL (resorcin formalin latex) treatment conventionally used for glass fibers on a core wire made of only carbon fibers, since the adhesiveness between the RFL and the carbon fibers and the vulcanization density of L of the RFL are insufficient, it is difficult to improve the permanent elongation, the bending fatigue resistance and the impact resistance of the belt to the physical properties of the same degree as those of the glass core wire.

The core wire of the present invention obtains a durability and an adhesiveness higher than those of the conventional glass core wire by performing a later-described treatment on a core wire of only carbon fibers to enhance stiffness.

The core wire treatment agent of the present invention contains HNBR, a zirconic coupling agent, hydrophobic silica, phenolic resin and potassium titanate. The zirconic coupling agent improves the adhesiveness of the treatment agent to the core material and the rubber portion, and the hydrophobic silica improves water resistance. Water resistance is improved by performing a treatment so that the treatment agent itself does not readily swell by the influence of moisture and ambient heat. The permanent deformation of the treatment agent itself that causes increase in the permanent elongation and the bending fatigue performance of the belt and reduction in water resistance is decreased based on the selection and quantity of the cross-linking agent. Since the treatment agent itself has strength, stiffness and elasticity and the permanent deformation thereof is small, core wires twisted by bending and tension of the belt are not in contact with each other because of the core material protection effect of the treatment agent.

Preferably, the core wire treatment agent contains zinc methacrylate. In this case, the permanent elongation property of the belt is excellent. A prepared product formed by finely dispersing zinc methacrylate in HNBR may be used.

Preferably, the zirconic coupling agent is contained in a proportion of not less than 0.1 mass % and not more than 4 mass % to the whole quantity of the treatment agent. In this case, adhesiveness is excellent, and permanent elongation is small.

Preferably, the hydrophobic silica is contained in a proportion of not less than 0.5 mass % and not more than 4 mass % to the whole quantity of the treatment agent. In this case, water resistance, workability and adhesiveness are excellent.

Preferably, the phenolic resin is contained in a proportion of not less than 3 mass % and not more than 27 mass % to the whole quantity of the treatment agent. In this case, adhesiveness is excellent, and permanent elongation is small.

Preferably, the potassium titanate is contained in a proportion of not less than 0.3 mass % and not more than 7 mass % to the whole quantity of the treatment agent. In this case, adhesiveness is excellent, and permanent elongation is small.

Preferably, SFR carbon is contained in a proportion of not less than 3 mass % and not more than 13 mass % to the whole quantity of the treatment agent. In this case, adhesiveness is excellent.

Preferably, sulfur is contained in a proportion of not less than 0.05 mass % and not more than 2 mass % to the whole quantity of the treatment agent. In this case, adhesiveness is excellent.

Preferably, an organic peroxide cross-linking agent such as di[(t-butylperoxy)isopropyl]benzene is contained in a proportion of not less than 2 mass % and not more than 10 mass %. In this case, adhesiveness is excellent, and permanent elongation is small.

Preferably, a co-cross-linking agent such as N—N'-m-phenylenedimaleimide is contained in a proportion of not less than 0.05 mass % and not more than 3 mass %. In this case, adhesiveness is excellent, and permanent elongation is small.

Preferably, the core wire treatment agent contains a hydrogenated carboxylic nitrile rubber and stearic acid.

The above-described core wire treatment agent is dissolved in an organic solvent, the core material formed of carbon fibers is impregnated therewith, and then, the core material is dried by using a drying oven.

(4) Manufacture of the Toothed Belt

Hereinafter, a method of manufacturing the toothed belt 1 will be described.

FIGS. 3A to 3C are schematic cross-sectional views for explaining the method of manufacturing the toothed belt 1.

First, an original canvas 60 made of nylon 6 or nylon 66 is immersed in the above-described tooth cloth rubber composition dissolved in an organic solvent, and is dried (FIG. 3A).

By doing this, the tooth cloth rubber composition (represented as dots in the figure) penetrates into grains 60a and covers also the surface of the original canvas 60, thereby obtaining the tooth cloth 6 (FIG. 3B).

Then, the tooth cloth 6 is wound on the outer surface of a cylindrical mold having tooth forming grooves, the core wire 2 is spirally wound thereon at a constant tension, and further thereon, an unvulcanized (uncross-linked) rubber sheet made of a rubber composition for the rubber portion is wound. Thereafter, this is placed in a vulcanization can and pressurized from the outer periphery side, and is heated with steam. The molding temperature is not less than 100 deg C. and not more than 130 deg C., and the molding pressure is not less than 6 MPa and not more than 10 MPa.

The rubber is softened by the pressurization and heating to form the tooth rubber portions 5, the tooth cloth 6 is bonded to the surface side of the tooth rubber portions 5, and the rubber is vulcanized to form the rubber portion 3, thereby obtaining the toothed belt 1 (FIG. 3C).

As described above, the tooth cloth 6 is overlaid on the cylindrical mold and joined at the time of manufacture, and when the toothed belt 1 is used under high load environment, it is preferable that the junction (joint) be at a tooth tip formed part of the belt. More preferably, the joint is at least within a range of the summit of a tooth rubber portion 5 formed part and situated at a central part. This is because tooth breakage readily occurs if the joint having weak strength is situated at the side surface and the tooth base of the tooth portion 7 repetitively rubbing against the pulley teeth or receiving a strong shearing force. Since the hard core wire 2 to which tension is applied is wound on the soft tooth cloth 6, the tooth cloth 6 is deformed by this tension, and even if adjustment is made in an early stage so that the joint is situated at the tooth tip, the joint can be curved by the tension and shifted from the tooth tip to be situated at the tooth side surface and the tooth base.

For a toothed belt of a tooth pitch of not less than 5 mm, since the tooth portion is comparatively large, it is easy to situate the joint in the vicinity of the summit of the tooth tip, and even if a shift occurs as described above, the joint is not very frequently situated at the tooth side surface or the tooth base. However, for a belt of a tooth pitch of not more than 3 mm, since the surface area of the tooth portion is small, it is difficult to situate the joint at the tooth tip for the reason mentioned above.

Although it depends on the joining method, as described above, when ends of the tooth cloth 6 are thermally welded together, there are cases where the joint of the tooth cloth 6 melts by heat and when it hardens, it digs into the tooth rubber portion 5 formed part as a mass (welding lump) of the tooth cloth 6, no rubber composition is sent to this part and this part cannot be formed into the tooth rubber portion 5.

Although there is a method in which the tooth cloth 6 is joined by sewing with a thread by using a sewing machine, there are cases where the needle holes formed at the time of sewing are enlarged by the pressure and heat at the time of molding and flow of the rubber composition causes oozing to the side surface of the tooth portion 7 to cause an unusual noise when the belt comes in contact with the pulleys and cause generation of rubber powder.

In the present invention, thermal welding is adopted as the joining method, and the tooth cloth 6 is joined so that the joint is oblique. Consequently, at the time of formation into a belt, although the joint also passes the tooth side surface and the tooth base without fail, the joint can be prevented from concentrating on the side surface of one tooth portion 7 to cause a welding lump.

It is apparent that the fewer the number of welded portions (the number of tooth portions where the joint passes) for one toothed belt, the more advantageous. However, the welding (joint) length occupancy for one tooth portion 7, that is, the welding angle is also important.

Figure 4:
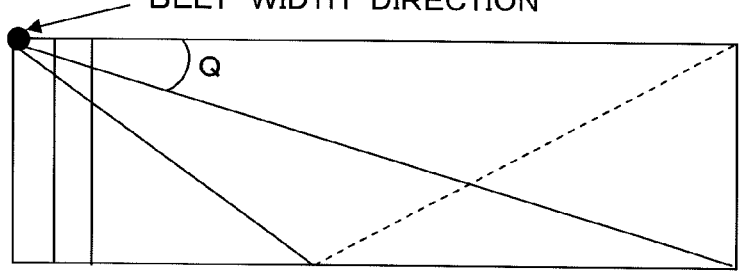
FIG. 4 is a schematic view showing a condition where the tooth cloth is wound on a cylindrical mold.
Figure 5:
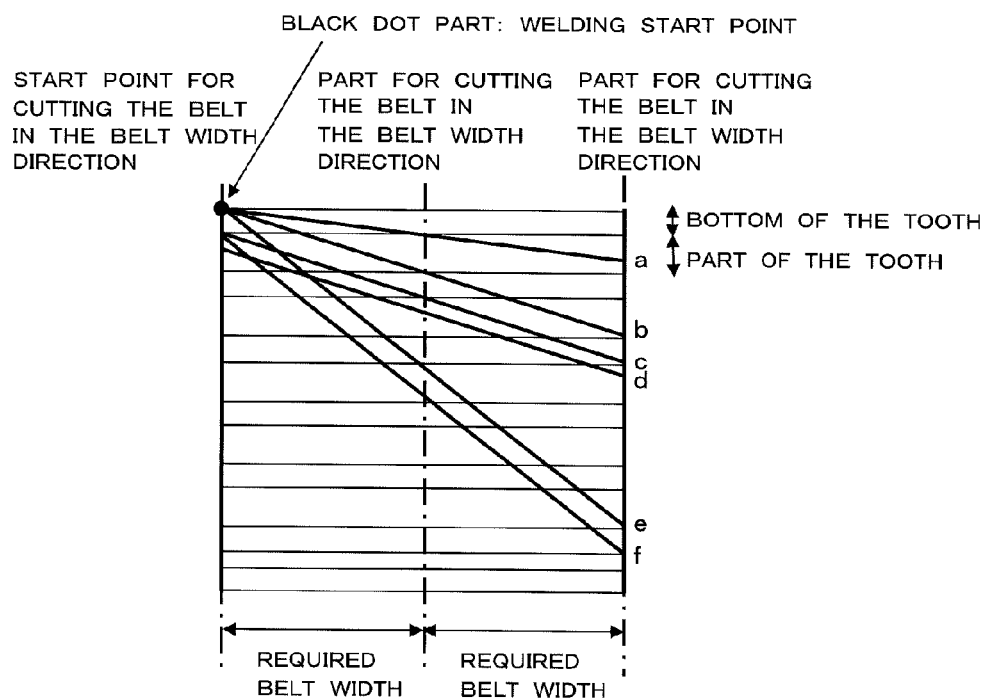
FIG. 5 is a partially enlarged view of FIG. 4.

FIG. 4 is a schematic view showing a condition where the tooth cloth 6 is wound on the cylindrical mold, and FIG. 5 is a partially enlarged view thereof.

From the viewpoint of reducing the number of welded portions, it is necessary that as shown in FIGS. 4 and 5, the welding start point and the start point for cutting the belt in the belt width direction be within the range of the tooth bottom formed part of the belt. From FIG. 5, by comparing the joints a, b and e, it is found that the larger the welding angle is, the larger the number of welded portions is. Moreover, by comparing the joints b, c and d, it is found that while for the joint b the welding start point of which is situated within the tooth bottom, the number of welded portions of one belt is one, for the joints c and d the welding start points of which are situated at the tooth portion 7, the number of welded portions is two, which is larger.

Figure 6:
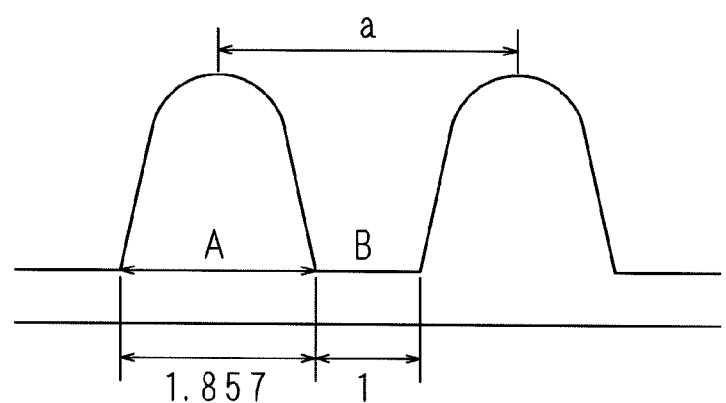
FIG. 6 is an explanatory view showing the relationship between a tooth portion base length A and a tooth bottom length B.

As shown in FIG. 6, when A:B=1.857:1 holds between a tooth portion base length A and a tooth bottom length B (when the tooth pitch is a [mm], A=0.65a and B=0.35a hold), the following expression (2) holds between a welding angle x (degrees) and a belt width y where the number of welded portions can be minimized:

$$y = 58.839 \times a \times x^{-1.0219} \quad (2)$$

The welding angles where the number of welded portions can be minimized obtained by the expression (2) when the belt width is changed to 6 mm, 10 mm, 15 mm, 20 mm, 25 mm, 30 mm and 35 mm when the tooth pitch is 2 mm and 3 mm are as shown in the following Table 1:

TABLE 1

| | WELDING ANGLE | |
|---|---|---|
| BELT WIDTH | TOOTH PITCH (2 mm) | TOOTH PITCH (3 mm) |
| 6 | 18.4 | 27.4 |
| 10 | 11.2 | 16.6 |
| 15 | 7.5 | 11.2 |
| 20 | 5.7 | 8.4 |
| 25 | 4.6 | 6.8 |
| 30 | 3.8 | 5.7 |
| 35 | 3.3 | 4.9 |

It has been found that it is possible to make the joint pass only a minimum number of tooth portions for one belt by setting a welding angle where the minimum number of welded portions can be achieved based on the difference in belt width as shown in Table 1 and setting the welding start point between the belt tooth bottoms as shown in FIGS. 4 and 5. However, it is necessary that the shearing force acting on the tooth portions of the belt and the angle of the welded portion with respect to the direction of the friction from the pulley teeth be also considered.

In the case of uses in vehicles making compactness the highest priority as in the present application, a belt width of not less than 31 mm deviates from the required performance. Since a belt width of less than 10 mm does not deliver capability, either, it is preferable that the belt width be in a range from 10 mm to 30 mm.

When the belt width is within the above-mentioned range and the tooth pitch is not more than 3 mm, the welding angle is set to not less than five degrees and not more than 15 degrees. When the welding angle is less than five degrees, the length of the joint situated in a part having low strength against the shearing force and the rubbing is large, so that the tooth breakage prevention effect is week. When the welding angle is higher than 15 degrees, the number of welded portions increases for one belt, so that problems arise such as poor yield of the canvas. From the viewpoint of durability and cost, it is preferable that the welding angle be set to not less than seven degrees and not more than ten degrees.

EXAMPLES

Hereinafter, examples of the present invention will be concretely described, and the present invention is not limited to these examples.

1. Production of the Tooth Cloth (i) Canvas

Canvases A to P having the lateral structures shown in Table 2 and the longitudinal structures shown in Table 3 were prepared.

TABLE 2

| | LATERAL DIRECTION | | | | |
|---|---|---|---|---|---|
| EXAMPLE | YARN SIZE (dtex) | NUMBER OF TWIST (NUMBER) | NUMBER OF FILAMENTS (NUMBER) | WOOF DENSITY (NUMBER/Inch) | WOOF INDEX VALUE |
| CANVAS A | 44 | 2 | 34 | 103 | 308176 |
| CANVAS B | 78 | 2 | 24 | 122 | 456768 |
| CANVAS C | 78 | 2 | 24 | 95 | 355680 |
| CANVAS D | 44 | 2 | 34 | 150 | 448800 |
| CANVAS E | 78 | 1 | 34 | 168 | 445536 |
| CANVAS F | 44 | 2 | 34 | 150 | 448800 |
| CANVAS G | 78 | 1 | 34 | 168 | 445536 |
| CANVAS H | 155 | 1 | 35 | 88 | 477400 |
| CANVAS I | 155 | 1 | 35 | 117 | 634725 |
| CANVAS J | 78 | 1 | 34 | 186 | 493272 |
| CANVAS K | 155 | 1 | 35 | 81 | 439425 |
| CANVAS L | 78 | 1 | 34 | 145 | 384540 |
| CANVAS M | 78 | 1 | 34 | 107 | 283764 |
| CANVAS N | 110 | 1 | 34 | 86 | 321640 |
| CANVAS O | 78 | 1 | 34 | 119 | 315588 |
| CANVAS P | 78 | 1 | 34 | 116 | 307632 |

TABLE 3

| | LONGITUDINAL DIRECTION | | | | | |
|---|---|---|---|---|---|---|
| EXAMPLE | YARN SIZE (dtex) | NUMBER OF TWIST (NUMBER) | NUMBER OF FILAMENTS (NUMBER) | WARP DENSITY (NUMBER/Inch) | WARP INDEX VALUE | TOTAL INDEX VALUE |
| CANVAS A | 44 | 1 | 34 | 291 | 435336 | 743512 |
| CANVAS B | 78 | 1 | 34 | 140 | 371280 | 828048 |
| CANVAS C | 44 | 1 | 34 | 197 | 294712 | 650392 |

TABLE 3-continued

| EXAMPLE | LONGITUDINAL DIRECTION | | | | | |
|---|---|---|---|---|---|---|
| | YARN SIZE (dtex) | NUMBER OF TWIST (NUMBER) | NUMBER OF FILAMENTS (NUMBER) | WARP DENSITY (NUMBER/Inch) | WARP INDEX VALUE | TOTAL INDEX VALUE |
| CANVAS D | 44 | 1 | 34 | 288 | 430848 | 879648 |
| CANVAS E | 44 | 1 | 34 | 288 | 430848 | 876384 |
| CANVAS F | 78 | 1 | 34 | 117 | 310284 | 759084 |
| CANVAS G | 78 | 1 | 34 | 117 | 310284 | 755820 |
| CANVAS H | 110 | 1 | 34 | 155 | 579700 | 1057100 |
| CANVAS I | 110 | 1 | 34 | 145 | 542300 | 1177025 |
| CANVAS J | 110 | 1 | 34 | 150 | 561000 | 1054272 |
| CANVAS K | 110 | 1 | 34 | 148 | 553520 | 992945 |
| CANVAS L | 110 | 1 | 34 | 154 | 575960 | 960500 |
| CANVAS M | 110 | 1 | 34 | 144 | 538560 | 822324 |
| CANVAS N | 110 | 1 | 34 | 164 | 613360 | 935000 |
| CANVAS O | 110 | 1 | 34 | 142 | 531080 | 846668 |
| CANVAS P | 110 | 1 | 34 | 129 | 482460 | 790092 |

For each of the canvases A to P, the lateral tensile strength, the longitudinal tensile strength and the tooth rubber portion area percentage were obtained. The tooth rubber portion area percentage was obtained by taking a picture of a cross section of the tooth portion and measuring the area. The results are shown in the following Table 4:

TABLE 4

| | INDEX VALUE RATIO (WOOF/WARP) | LATERAL TENSILE STRENGTH (N) | LONGITUDINAL TENSILE STRENGTH(N) | TOOTH RUBBER PORTION AREA PERCENTAGE (%) | MOLDABILITY | CLOTH AREA PERCENTAGE | REQUIRED LATERAL STRENGTH |
|---|---|---|---|---|---|---|---|
| CANVAS A | 71% | 472 | 754 | 56.3 | ○ | ○ | X |
| CANVAS B | 123% | 748 | 612 | 50.5 | X | ○ | ○ |
| CANVAS C | 121% | 636 | 618 | 64.3 | X | ○ | ○ |
| CANVAS D | 104% | 600 | 766 | 47.5 | ○ | ○ | ○ |
| CANVAS E | 103% | 600 | 766 | 47.7 | ○ | ○ | ○ |
| CANVAS F | 145% | 600 | 500 | 55.1 | X | ○ | ○ |
| CANVAS G | 144% | 600 | 500 | 55.3 | X | ○ | ○ |
| CANVAS H | 82% | 570 | 891 | 39.6 | ○ | X | ○ |
| CANVAS I | 117% | 767 | 779 | 35.5 | X | X | ○ |
| CANVAS J | 88% | 676 | 872 | 39.7 | ○ | X | ○ |
| CANVAS K | 79% | 518 | 817 | 42.1 | ○ | X | ○ |
| CANVAS L | 67% | 441 | 877 | 43.5 | ○ | X | X |
| CANVAS M | 53% | 376 | 865 | 50.9 | ○ | ○ | X |
| CANVAS N | 52% | 466 | 896 | 44.7 | ○ | X | X |
| CANVAS O | 59% | 398 | 771 | 49.4 | ○ | ○ | X |
| CANVAS P | 64% | 385 | 743 | 52.9 | ○ | ○ | X |

Figure 7A:
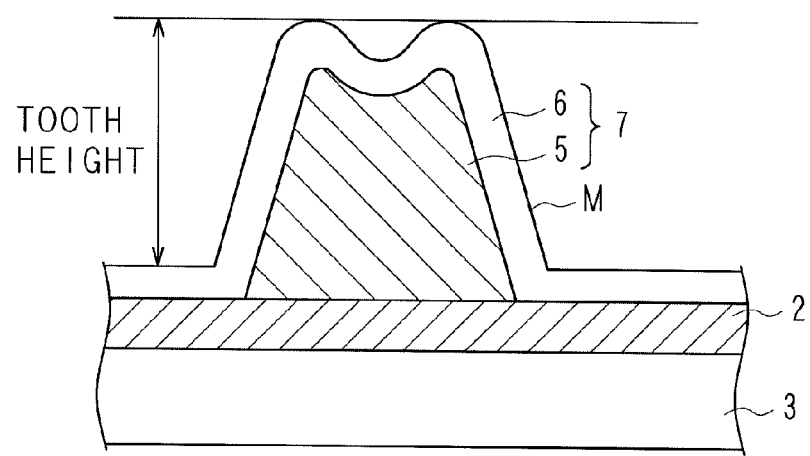
FIG. 7A is an explanatory view for explaining a tooth height.
Figure 7B:
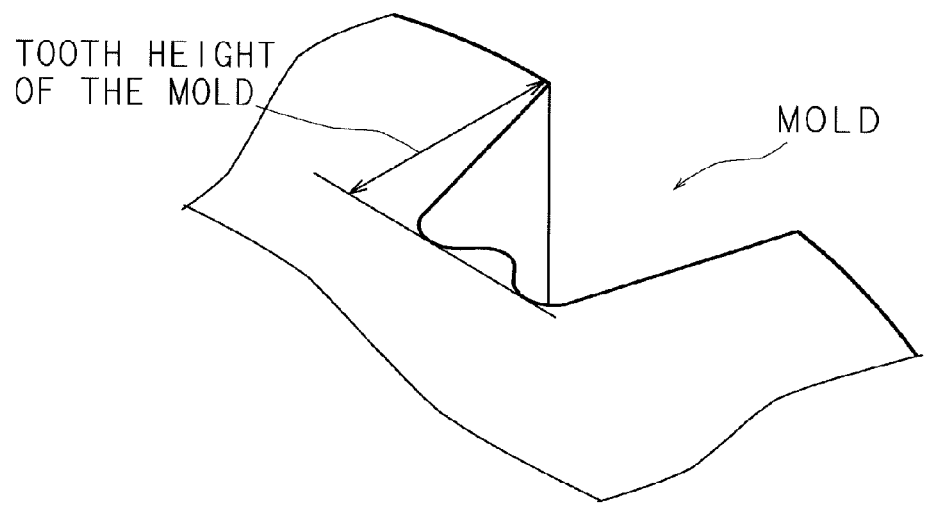
FIG. 7B is an explanatory view for explaining a prescribed tooth height (the tooth height of the mold)

Table 4 also includes evaluations shown below.
Required lateral strength
  ○ . . . The lateral tensile strength is not less than 500 N/3 cm.
  x . . . The lateral tensile strength is less than 500 N/3 cm.
Cloth area percentage
  ○ . . . The tooth rubber portion area percentage is not less than 45%.
  . . . The tooth rubber portion area percentage is less than 45%.
Moldability
  . . . The tooth height is not less than 90% of the prescribed tooth height.
  . . . The tooth height is less than 90% of the prescribed height.
FIG. 7A is an explanatory view for explaining the tooth height, and FIG. 7B is an explanatory view for explaining the prescribed tooth height (the tooth height of the mold). As shown in FIG. 7A, the height from the surface of the tooth cloth 6 corresponding to the tooth bottom to the summit surface of the tooth portion 7 is the "tooth height", and as shown in FIG. 7B, the depth from the surface of a cavity type mold to the bottom of the cavity is the "prescribed tooth height". As mentioned above, the moldability is "○" when the tooth height is not less than 90% of the prescribed tooth height.

Figure 8:
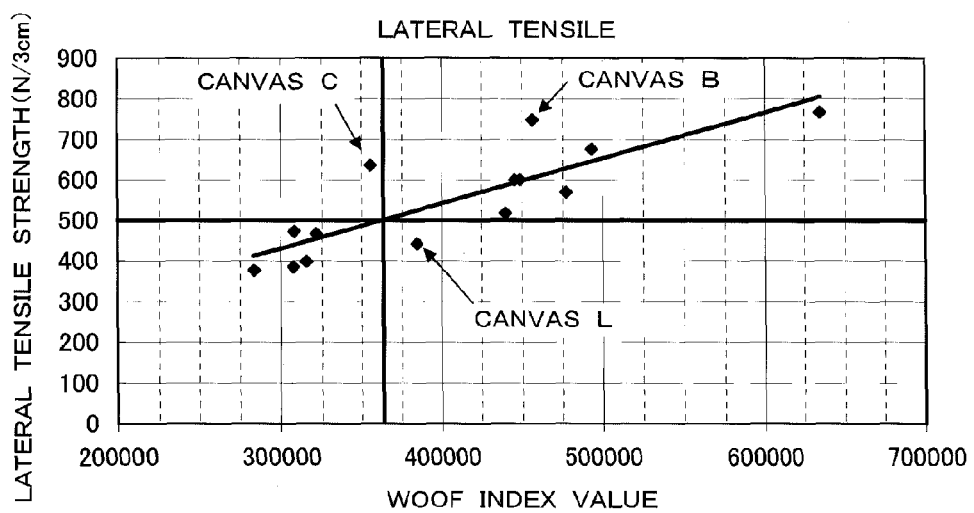
FIG. 8 is a graph showing the relationship between a woof index value and a lateral tensile strength of the canvas.
Figure 9:
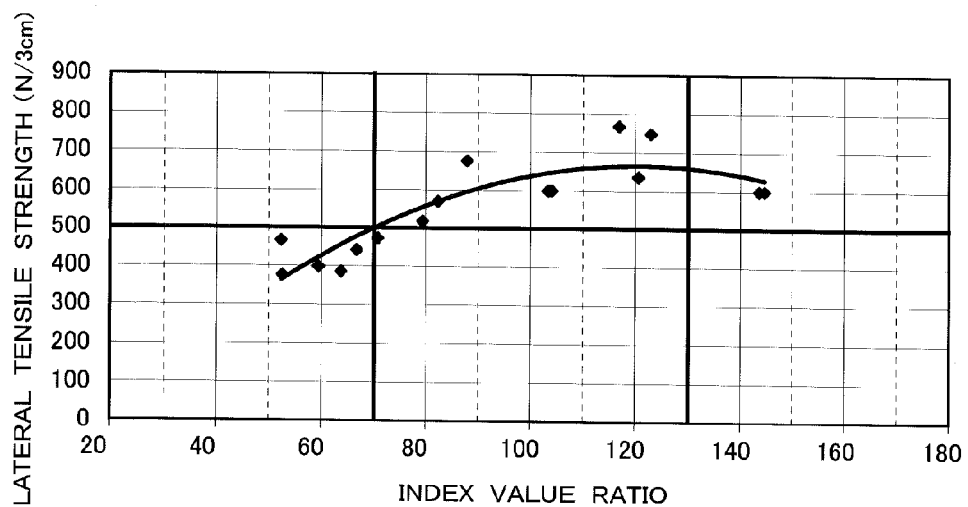
FIG. 9 is a graph showing the relationship between an index value ratio and the lateral tensile strength of the canvas.

FIG. 8 is a graph showing the relationship between the woof index value and the lateral tensile strength, and FIG. 9 is a graph showing the relationship between the index value ratio and the lateral tensile strength.

From FIG. 8, it is found that the lateral tensile strength is improved by increasing the woof index value. To obtain a lateral tensile strength not less than the target strength (500 N/3 cm), it is necessary that the woof index value be not less than 370000. However, although the canvas L, for example, has a woof index value of not less than 370000, the lateral tensile strength thereof is low. This is because stress is liable to concentrate for the lateral tension since the index value ratio is as low as 67% (the warp index value is high).

Moreover, the canvases B, C and the like have a high strength compared with the woof index value. This is because the index value ratio is as high as 120%, the stress concentration in the lateral direction is small and the decrease in yarn strength is small.

From FIG. 9, when the index value ratio is not less than 130%, the lateral tensile strength is reduced, and this is considered to be because even if the woof index value is increased too much with the warp index value being fixed, uneven parts increase at the time of paralleling of yarn lengths due to unevenness at the time of manufacture in the lateral direction, moldability is poor and strength is not significantly improved. It is also found that strength is insufficient when the index value ratio is less than 70%. When considered from the viewpoint of the strength of the canvas in the lateral direction, it is found that the woof index value is necessarily not less than 370000 and the index value ratio is necessarily not less than 70% and not more than 30%.

FIG. 10 is a graph showing the relationship between the total index value and the tooth rubber portion area percentage.

From FIG. 10, it is found that the total index value is necessarily not more than 930000 in order that the tooth rubber portion area percentage is not less than 45%.

From the above, it is found that when the woof index value is not less than 370000, the total index value is not more than 930000 (the warp index value is not more than 560000) and the index value ratio is not less than 70% and not more than 130%, excellent tensile strength and tooth rubber portion area percentage are provided and moldability is excellent. Preferably, the index value is not less than 70% and not more than 120%.

FIG. 11 is a graph showing the relationship between each index value and the index value ratio. When an approximate expression is formulated from the above-mentioned requirements and the points of intersection thereof with the index value ratio are obtained, it is found that a range from an index value ratio of 70% (the woof index value=370000, the warp index value=555000, the total index value=925000) to an index value ratio of 130% (the woof index value=525000, the warp index value=400000, the total index value=925000) is suitable.

(ii) Tooth Cloth

A tooth cloth rubber composition was prepared by mixing the following according to the composition (shown in mass part) of Table 5 shown below: HNBR ("Zetpol [trademark] 2020" manufactured by Zeon Corporation); hydrogenated carboxylic NBR (C-NBR) ("Therban XT" manufactured by Lanxess); CHC (epichlorohydrin polymer) ("Epichlomer C, D or CG" manufactured by Daiso Co., Ltd.); zinc methacrylate ("R20S" manufactured by Asada Chemical Industry Co., Ltd.); stearic acid; magnesium oxide; ETU (ethylenethiourea); sulfur; hydrophobic silica ("SS10" manufactured by Tosoh Silica Corporation); PTFE (Teflon [trademark] powder); phenolic resin ("Sumiliteresin PR7031A" manufactured by Sumitomo Bakelite Co., Ltd., novolak phenol); blocked isocyanate (a type unblocked by heating); di[(t-butylperoxy)isopropyl]benzene ("Perbutyl P-40" manufactured by NOF Corporation, 40% diluted, cross-linking agent); N—N'-m-phenylenedimaleimide ("Vulnoc PM" manufactured by Ouchi Shinko Chemical Industrial Co., Ltd., co-cross-linking agent); graphite; conductive zinc oxide ("Zinc Oxide 23-K" manufactured by Hakusui Tech Co., Ltd.); a potassium titanate whisker ("Tismo D101" manufactured by Otsuka Chemical Co., Ltd.); and a vulcanization accelerator ("Nocceler CZ" manufactured by Ouchi Shinko Chemical Industrial Co., Ltd.).

The physical properties of "Zetpol 2020" are as follows: the quantity of bound acrylonitrile is 36.2 mass %, the iodine value (center value) is 28 mg/100 mg, and the Mooney viscosity is 78.

TABLE 5

| COMPOSITION EXAMPLE | MASS PART | % |
|---|---|---|
| HNBR | 100 | 34.9% |
| C-HNBR | 10 | 3.5% |
| CHC | 40 | 14.0% |
| ZINC METHACRYLATE | 20 | 7.0% |
| STEARIC ACID | 1 | 0.3% |
| MAGNESIUM OXIDE | 1.2 | 0.4% |
| ETU | 0.4 | 0.1% |
| SULFUR | 0.1 | 0.0% |
| HYDROPHOBIC SILICA | 5 | 1.7% |
| PTFE | 60 | 20.9% |
| PHENOLIC RESIN | 15 | 5.2% |
| BLOCKED ISOCYANATE | 2 | 0.7% |
| DI[(t-BUTYLPEROXY)ISOPROPYL] BENZENE | 8 | 2.8% |
| N-N'-m-PHENYLENEDIMALEIMIDE | 0.5 | 0.2% |
| GRAPHITE | 10 | 3.5% |
| CONDUCTIVE ZINC OXIDE | 10 | 3.5% |
| POTASSIUM TITANATE | 3 | 1.0% |
| VULCANIZATION ACCELERATOR | 0.4 | 0.1% |
| TOTAL | 286.6 | 100.0% |

A tooth cloth was obtained by impregnating a canvas where the woof index value was not less than 370000, the total index value was not more than 930000 and the index value ratio was not less than 70% and not more than 130%, with the tooth cloth rubber composition of the above composition.

The obtained tooth cloth was excellent in conductivity, wear resistance, adhesiveness, water resistance and high load resistance.

2. Treatment of the Core Wire

A core wire treatment agent (core wire rubber composition) was prepared by mixing the following according to the composition (shown in mass part) of Table 6 shown below: HNBR (the above-mentioned "Zetpol 2020"), C-NBR (the above-mentioned "Therban XT"); zinc methacrylate (the above-mentioned "R20S"); stearic acid; hydrophobic silica (the above-mentioned "Silica SS10"), SRF carbon; phenolic resin (the above-mentioned "Sumiliteresin PR7031A"), a zirconium coupling agent (zirconate coupling agent manufactured by Kenrich Petrochemicals, Inc., mercapto organic zirconate coupling agent); sulfur; a potassium titanate whisker (the above-mentioned "Tismo D101"), and di[(t-butylperoxy)isopropyl]benzene (the above-mentioned "Perbutyl P-40", 40% diluted, cross-linking agent); N—N'-m-phenylenedimaleimide (the above-mentioned "Vulnoc PM").

TABLE 6

| COMPOSITION EXAMPLE | phr | % |
|---|---|---|
| HNBR | 80 | 51.7% |
| C-HNBR | 10 | 6.5% |
| ZINC METHACRYLATE | 15 | 9.7% |
| STEARIC ACID | 1 | 0.6% |
| HYDROPHOBIC SILICA | 5 | 3.2% |
| SRF CARBON | 10 | 6.5% |
| PHENOLIC RESIN | 20 | 12.9% |
| ZIRCONIUM COUPLING AGENT | 2 | 1.3% |
| SULFUR | 0.3 | 0.2% |
| POTASSIUM TITANATE | 3 | 1.9% |

TABLE 6-continued

| COMPOSITION EXAMPLE | phr | % |
|---|---|---|
| DI[(t-BUTYLPEROXY)ISOPROPYL] BENZENE | 8 | 5.2% |
| N-N'-m-PHENYLENEDIMALEIMIDE | 0.5 | 0.3% |
| TOTAL | 154.8 | 100.0% |

A treatment was performed in which the core wire rubber composition of the above composition was dissolved in an organic solvent and a core wire made of carbon fibers was impregnated therewith.

The obtained core wire was high in stiffness, and was higher in durability and adhesiveness than a glass core wire.

3. Examination of the Canvas Joining Method

As mentioned above, it is necessary that the welding angle satisfy the welding angle where the minimum number of welded portions of Table 1 is achieved and be determined in consideration of the influence of the shearing force acting on the tooth portions of the belt and the friction from the pulley teeth. The belt width, the welding angle and the number of welded portions (the number of tooth portions where the joint passes) were examined.

By using a rubber portion composition of a later-described composition example 1 as the rubber portion composition of the belt body and using a nylon-66-made tooth cloth and core wire having undergone the above-described treatments, belts having the belt widths and the welding angles shown in Table 7 were formed. Table 7 shows the number of welded portions at each belt width and welding angle when the tooth pitch is 2 mm.

TABLE 7

| BELT WIDTH | WELDING ANGLE(°) | | | | | |
|---|---|---|---|---|---|---|
| (mm) | 3 | 5 | 7 | 10 | 15 | 20 |
| 10 | 1 | 1 | 1 | 1 | 2 | 2 |
| 15 | 1 | 1 | 1 | 2 | 3 | 3 |
| 20 | 1 | 1 | 2 | 2 | 3 | 4 |
| 25 | 1 | 2 | 2 | 3 | 4 | 5 |
| 30 | 1 | 2 | 2 | 3 | 5 | 6 |

By using chloroprene rubber as the rubber portion component of the belt body and using a nylon-66-made tooth cloth and core wire having undergone the above-described treatments, belts having the belt widths and the welding angles shown in Table 8 were formed. Table 8 shows the number of welded portions at each belt width and welding angle when the tooth pitch is 3 mm.

TABLE 8

| BELT WIDTH | WELDING ANGLE(°) | | | | | |
|---|---|---|---|---|---|---|
| (mm) | 3 | 5 | 7 | 10 | 15 | 20 |
| 10 | 1 | 1 | 1 | 1 | 1 | 2 |
| 15 | 1 | 1 | 1 | 1 | 2 | 2 |
| 20 | 1 | 1 | 1 | 2 | 2 | 3 |
| 25 | 1 | 1 | 2 | 2 | 3 | 4 |
| 30 | 1 | 1 | 2 | 2 | 3 | 4 |

The belts were wound around two pulleys, and the endurance time to the occurrence of a tooth breakage was measured.

The test conditions were as follows:
Belt: 360 mm in length
Number of pulley teeth: 30T-30T
Rotation speed: 3000 r/m The load torque (N·m) and the installation tension (N) of each belt width at each tooth pitch is shown in Table 9 shown below.

TABLE 9

| TOOTH PITCH | | BELT WIDTH (mm) | | | | |
|---|---|---|---|---|---|---|
| | | 10 | 15 | 20 | 25 | 30 |
| 3 (mm) | LOAD TORQUE (N·m) | 4.38 | 6.95 | 9.64 | 12.44 | 15.31 |
| | INSTALLATION TENSION(N) | 52 | 82 | 114 | 148 | 182 |
| 2 (mm) | LOAD TORQUE (N·m) | 2.29 | 3.63 | 5.04 | 6.50 | 8.01 |
| | INSTALLATION TENSION(N) | 52 | 82 | 114 | 148 | 182 |

Figure 12:
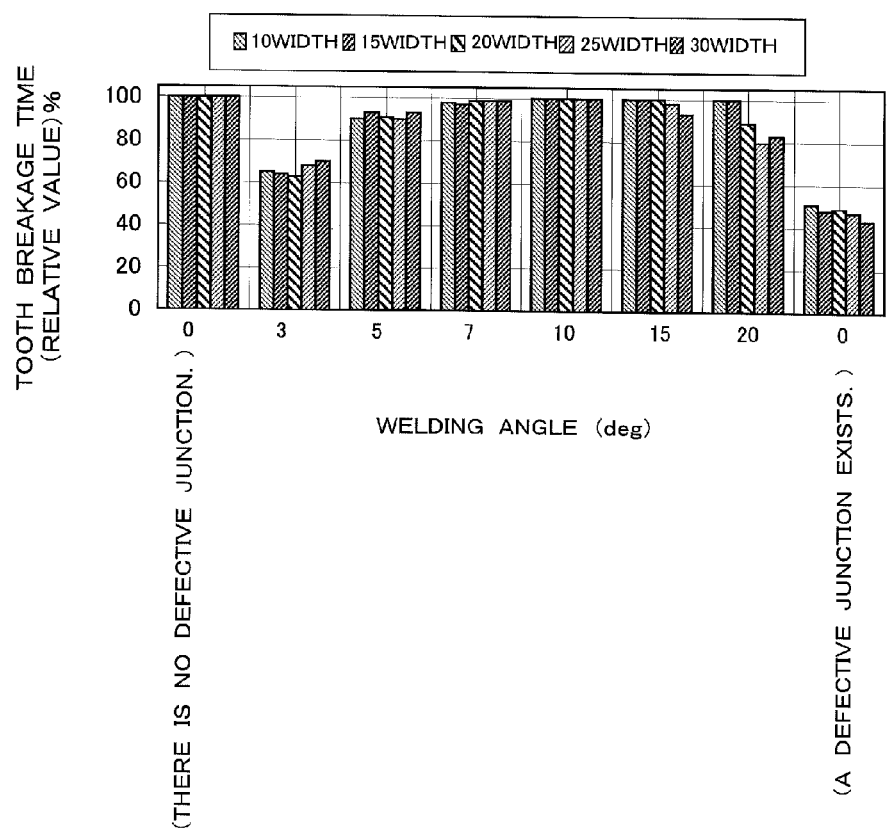
FIG. 12 is a graph showing the tooth breakage time of each belt when the tooth pitch is 3 mm.

FIG. 12 is a graph showing the tooth breakage time for each belt when the tooth pitch is 3 mm. The tooth breakage time is represented as a relative value when the welding angle is 0 degrees and the value in a case where there is no defective junction is 100%. In FIG. 12, a defective junction is regarded as being present when the junction (joint) is situated at the tooth base of a tooth portion of the belt in a case where the welding angle is 0 degrees.

FIG. 13 is a graph showing the tooth breakage time for each belt when the tooth pitch is 2 mm. The tooth breakage time is represented as a relative value when the welding angle is 0 degrees and the value in a case where there is no defective junction is 100%. In FIG. 13, a defective junction is regarded as being present when the junction (joint) is situated at the tooth base of a tooth portion of the belt in a case where the welding angle is 0 degrees.

From FIGS. 12 and 13, it is found that when the tooth pitch is not more than 3 mm, the welding angle is preferably not less than five degrees and not more than 15 degrees. When the welding angle is not less than 20 degrees, the yield of the canvas is poor, and cost increases. It is more preferable that the welding angle be not less than seven degrees to not more than 15 degrees.

4. Belt Body (1) Rubber Portion Composition

Composition Example 1

A rubber portion composition of composition example 1 was obtained by mixing the following according to the composition (shown in mass part and mass %) of Table 10 shown below: HNBR ("Zetpol [trademark] 4310" manufactured by Zeon Corporation); an HNBR polymer alloy ("Zeoforte ZSC4195CX" manufactured by Zeon Corporation); TMLA ester (trimellitic acid triisononyl, "Adekacizer C9N" manufactured by Adeka Corporation); DOS (manufactured by Daihachi Chemical Industry Co., Ltd.); 4,4'-bis(α-α-dimethylbenzyl)diphenylamine ("Nocrac CD" manufactured by Ouchi Shinko Chemical Industrial Co., Ltd., antioxidant); silica ("Nipsil ss10" manufactured by Tosoh Silica Corporation); wax ("Suntight" manufactured by Seiko Chemical Co., Ltd.), sulfur ("Sulfax PMC" manufactured by Tsurumi Chemical Industry Co., Ltd., cross-linking agent); N-cyclohexyl-2-benzothiazolyl sulfenamide ("NOCCELER CZ-G"

manufactured by Ouchi Shinko Chemical Industrial Co., Ltd, vulcanization accelerator); high molecular weight HNBR ("Zetpol 2010H" manufactured by Zeon Corporation); di[(t-butylperoxy)isopropyl]benzene ("Perbutyl P-40" manufactured by NOF Corporation, 40% diluted, cross-linking agent); N—N'-m-phenylenedimaleimide ("Vulnoc PM" manufactured by Ouchi Shinko Chemical Industrial Co., Ltd., co-cross-linking agent); and FEF carbon.

The physical properties of "Zetpol 4310" are as follows: the quantity of bound acrylonitrile is 18.6 mass %, the iodine value (center value) is 15 mg/100 mg, and the Mooney viscosity is 80. The physical properties of "Zetpol 2010H" are as follows: The quantity of bound acrylonitrile is 36.2 mass %, the iodine value (center value) is 11 mg/100 mg, and the Mooney viscosity is not less than 120. The base polymer of "ZSC4195CX" is "Zetpol 4310".

TABLE 10

| | COMPOSITION EXAMPLE | | | | | | | | | | | | | |
|---|---|---|---|---|---|---|---|---|---|---|---|---|---|---|
| | 1 | | 2 | | 3 | | 4 | | 5 | | 6 | | 7 | |
| | MASS PART | % | MASS PART | % | MASS PART | % | MASS PART | % | MASS PART | % | MASS PART | % | MASS PART | % |
| HNBR | 25 | 16.6 | 25 | 16.6 | 25 | 16.6 | 25 | 16.6 | 25 | 16.6 | 25 | 16.6 | 25 | 16.6 |
| HNBR POLYMER ALLOY | 60 | 39.8 | 60 | 39.8 | 60 | 39.8 | 60 | 39.8 | 60 | 39.8 | 60 | 39.8 | 60 | 39.8 |
| TMLA ESTER | 6 | 4.0 | 7.60 | 5.0 | 4 | 2.65 | — | — | 8 | 5.3 | 2 | 1.3 | 7.76 | 5.1 |
| DOS | 2 | 1.3 | 0.40 | 0.3 | 4 | 2.65 | 8 | 5.3 | — | — | 6 | 4.0 | 0.24 | 0.2 |
| 4,4'-BIS(α-α-DIMETHYLBENZYL) DIPHENYLAMINE | 1 | 0.7 | 1 | 0.7 | 1 | 0.7 | 1 | 0.7 | 1 | 0.7 | 1 | 0.7 | 1 | 0.7 |
| SILICA | 5 | 3.3 | 5 | 3.3 | 5 | 3.3 | 5 | 3.3 | 5 | 3.3 | 5 | 3.3 | 5 | 3.3 |
| WAX | 1 | 0.7 | 1 | 0.7 | 1 | 0.7 | 1 | 0.7 | 1 | 0.7 | 1 | 0.7 | 1 | 0.7 |
| SULFUR | 0.2 | 0.1 | 0.2 | 0.1 | 0.2 | 0.1 | 0.2 | 0.1 | 0.2 | 0.1 | 0.2 | 0.1 | 0.2 | 0.1 |
| N-CYCLOHEXYL-2-BENZOTHIAZOLYL SULFENAMIDE | 1 | 0.7 | 1 | 0.7 | 1 | 0.7 | 1 | 0.7 | 1 | 0.7 | 1 | 0.7 | 1 | 0.7 |
| HIGH MOLECULAR WEIGHT HNBR | 20 | 13.3 | 20 | 13.3 | 20 | 13.3 | 20 | 13.3 | 20 | 13.3 | 20 | 13.3 | 20 | 13.3 |
| DI[(t-BUTYLPEROXY) ISOPROPYL]BENZENE) | 8.5 | 5.6 | 8.5 | 5.6 | 8.5 | 5.6 | 8.5 | 5.6 | 8.5 | 5.6 | 8.5 | 5.6 | 8.5 | 5.6 |
| N—N'-m-PHENYLENEDI MALEIMIDE | 1 | 0.7 | 1 | 0.7 | 1 | 0.7 | 1 | 0.7 | 1 | 0.7 | 1 | 0.7 | 1 | 0.7 |
| FEF CARBON | 20 | 13.3 | 20 | 13.3 | 20 | 13.3 | 20 | 13.3 | 20 | 13.3 | 20 | 13.3 | 20 | 13.3 |
| TOTAL | 150.7 | 100 | 150.7 | 100 | 150.7 | 100 | 150.7 | 100 | 150.7 | 100 | 150.7 | 100 | 150.7 | 100 |

Composition Examples 2 to 7

Rubber portion compositions of composition examples 2 to 7 were obtained according to the above-mentioned composition of Table 10.

Composition Examples 8 to 11

Rubber portion compositions of composition examples 8 to 11 were obtained according to the above-mentioned composition of Table 11.

TABLE 11

| | COMPOSITION EXAMPLE | | | | | | | |
|---|---|---|---|---|---|---|---|---|
| | 8 | | 9 | | 10 | | 11 | |
| | MASS PART | % | MASS PART | % | MASS PART | % | MASS PART | % |
| HNBR | 25 | 16.8 | 25 | 16.1 | 25 | 17.2 | 25 | 15.8 |
| HNBR POLYMER ALLOY | 60 | 40.4 | 60 | 38.6 | 60 | 41.2 | 60 | 37.9 |
| TMLA ESTER | 4.4 | 3.0 | 9.5 | 6.1 | 2.18 | 1.5 | 11.85 | 7.5 |
| DOS | 1.47 | 1.0 | 3.18 | 2.0 | 0.73 | 0.5 | 3.95 | 2.5 |
| 4,4'-BIS(α-α-DIMETHYLBENZYL) DIPHENYLAMINE | 1 | 0.7 | 1 | 0.6 | 1 | 0.7 | 1 | 0.6 |
| SILICA | 5 | 3.4 | 5 | 3.2 | 5 | 3.4 | 5 | 3.2 |
| WAX | 1 | 0.7 | 1 | 0.6 | 1 | 0.7 | 1 | 0.6 |
| SULFUR | 0.2 | 0.1 | 0.2 | 0.1 | 0.2 | 0.1 | 0.2 | 0.1 |
| N-CYCLOHEXYL-2-BENZOTHIAZOLYL SULFENAMIDE | 1 | 0.7 | 1 | 0.6 | 1 | 0.7 | 1 | 0.6 |

TABLE 11-continued

| | COMPOSITION EXAMPLE | | | | | | | |
|---|---|---|---|---|---|---|---|---|
| | 8 | | 9 | | 10 | | 11 | |
| | MASS PART | % | MASS PART | % | MASS PART | % | MASS PART | % |
| HIGH MOLECULAR WEIGHT HNBR | 20 | 13.5 | 20 | 12.9 | 20 | 13.7 | 20 | 12.6 |
| DI[(t-BUTYLPEROXY) ISOPROPYL]BENZENE) | 8.5 | 5.7 | 8.5 | 5.5 | 8.5 | 5.8 | 8.5 | 5.4 |
| N—N'-m-PHENYLENEDI MALEIMIDE | 1 | 0.7 | 1 | 0.6 | 1 | 0.7 | 1 | 0.6 |
| FEF CARBON | 20 | 13.5 | 20 | 12.9 | 20 | 13.7 | 20 | 12.6 |
| TOTAL | 148.57 | 100 | 155.38 | 100 | 145.6 | 100 | 158.5 | 100 |

(2) Evaluation of Heat Resistance

From the rubber portion compositions of composition examples 1 to 11, rubber sheets were formed by hydraulic pressing (for 30 minutes at 160 deg C.).

The rubber sheets were placed in a gear oven and heated at 140 deg C., and the rubber physical property after 144 hours was evaluated. The heat resistance evaluation items are as follows:

(i) Heating Loss

Represented as the decreasing rate % when the mass before the test (aging) is 100%.

(ii) EB (Breaking Elongation)

Represented as the decreasing rate % when the EB (breaking elongation: rubber breaking strength [JIS K 6251 (Dumbbell No. 3)]) of each rubber before the test is 100%.

(iii) 100% Modulus

Represented as the increasing rate % when the 100% modulus (JIS K 6254 [Strip-Shaped No. 1] of each rubber before the test is 100%.

(iv) Rubber Hardness

Represented as the increase amount (point) from the hardness (JIS K 6253 [[durometer hardness "Type A") of each rubber before the test.

Table 12 shown below shows the following of the composition examples 1 to 11: the DOS:TMLA ester (mass part ratio); the mass percentage to the whole quantity of the rubber portion composition of the plasticizer; the mass percentage to the whole quantity of the rubber portion composition of the DOS; and the mass percentage of the DOS to the whole quantity of the plasticizer.

TABLE 12

| | COMPOSITION EXAMPLE | | | | | | |
|---|---|---|---|---|---|---|---|
| | 5 | 7 | 2 | 1 | 3 | 6 | 4 |
| DOS:TMLA ESTER | 0:1 | 1:32.3 | 1:19 | 1:3 | 1:1 | 1:0.3 | 1:0 |
| MASS PERCENTAGE OF THE PLASTICIZER % | | | | 5.3 | | | |
| MASS PERCENTAGE OF THE DOS % | 0 | 0.2 | 0.3 | 1.3 | 2.65 | 4 | 5.3 |
| DOS/PLASTICIZER | 0 | 3.8 | 5.7 | 25 | 50 | 75 | 100 |

TABLE 12-continued

| | COMPOSITION EXAMPLE | | | | |
|---|---|---|---|---|---|
| | 10 | 8 | 1 | 9 | 11 |
| DOS:TMLA ESTER | | | 1:3 | | |
| MASS PERCENTAGE OF THE PLASTICIZER % | 2 | 4 | 5.3 | 8 | 10 |
| MASS PERCENTAGE OF THE DOS % | 0.5 | 1.0 | 1.3 | 2 | 2.5 |
| DOS/PLASTICIZER | 25 | 25 | 25 | 25 | 25 |

The test results are shown in FIGS. 14 to 18.

Figure 14:
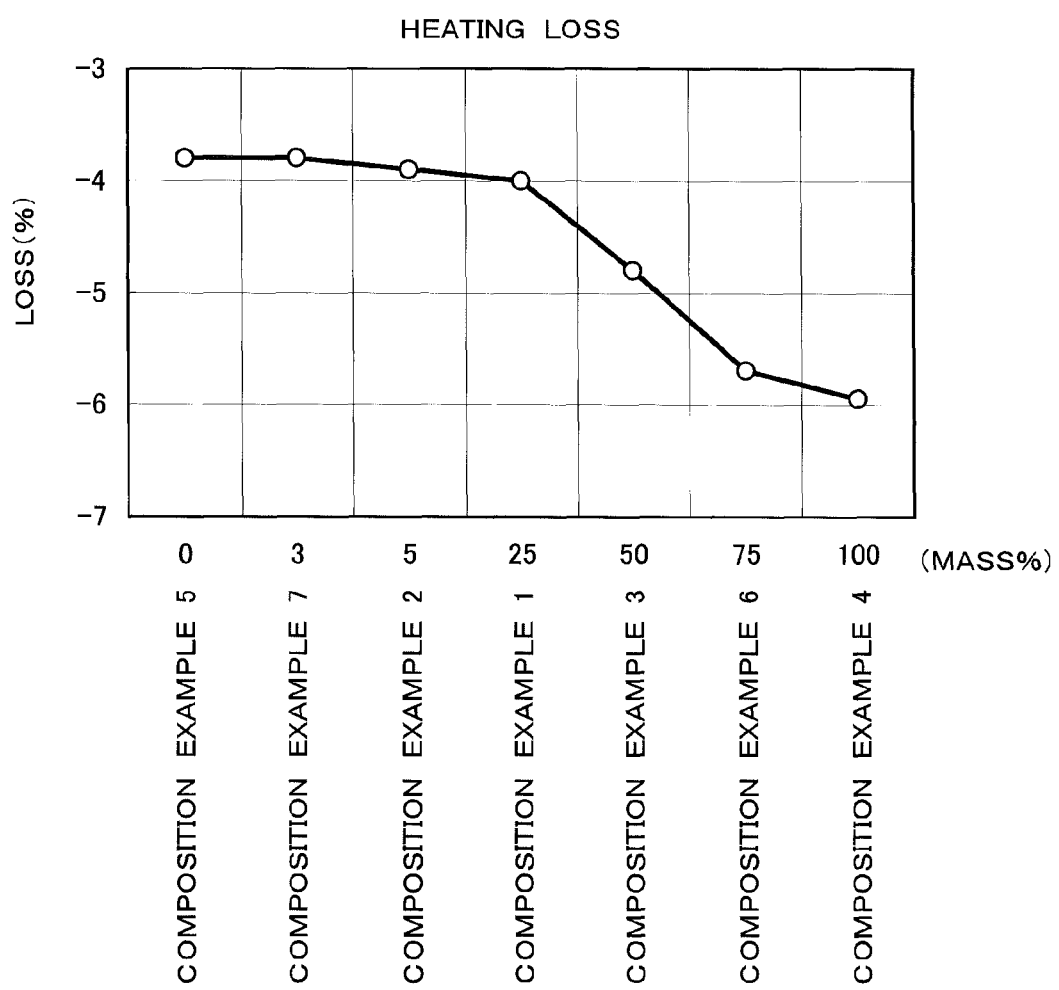
FIG. 14 is a graph showing the relationship between the mass percentage of DOS to the whole mass of a plasticizer and a heating loss (%)
Figure 15:
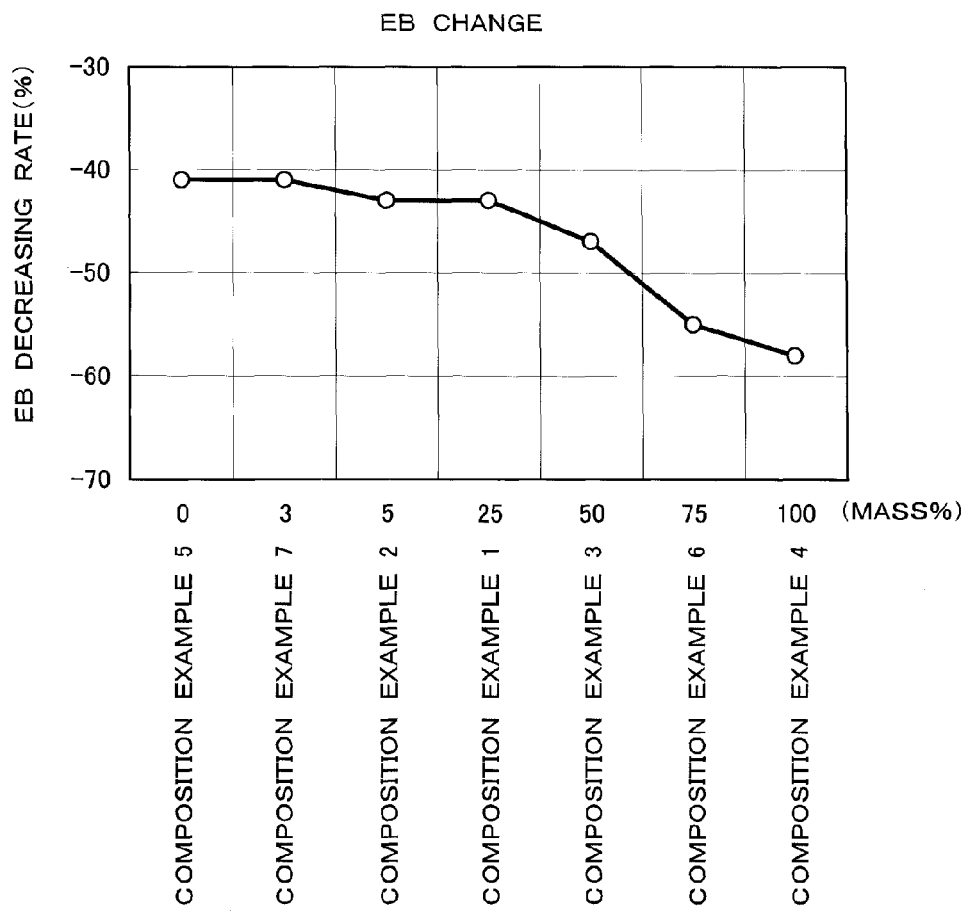
FIG. 15 is a graph showing the relationship between the mass percentage of the DOS to the whole mass of the plasticizer and an EB decreasing rate (%)
Figure 16:
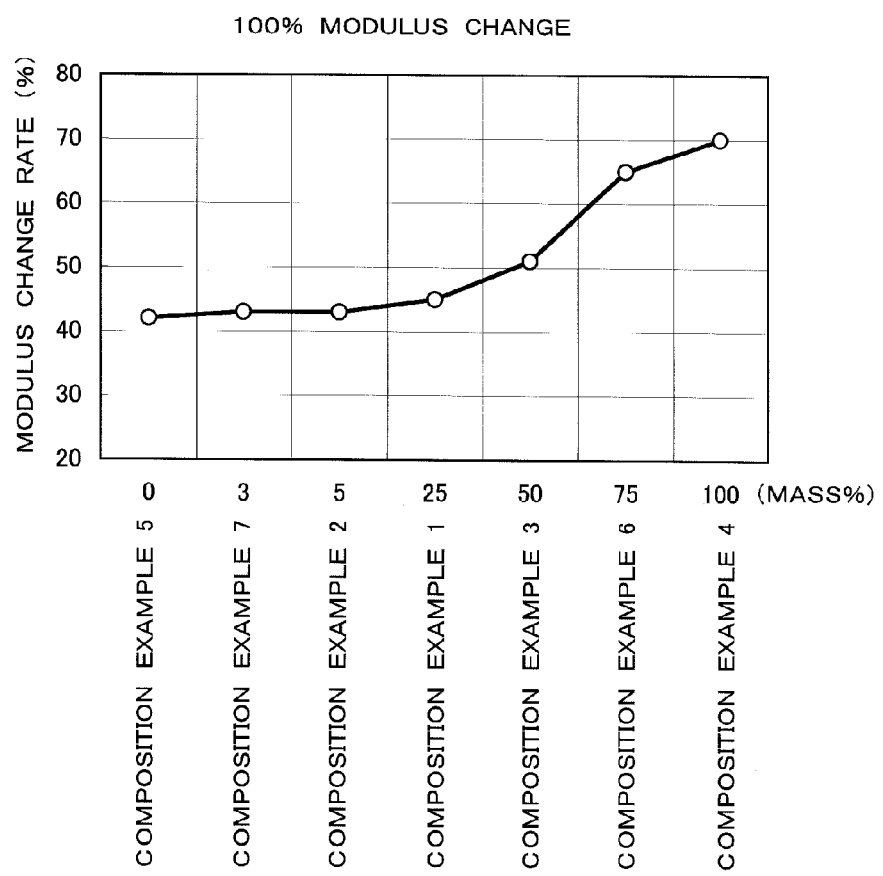
FIG. 16 is a graph showing the relationship between the mass percentage of the DOS to the whole mass of the plasticizer and a modulus change rate (%)

FIG. 14 is a graph showing the relationship between the mass percentage of the DOS to the whole quantity of the plasticizer (corresponding to the rubber sheets of composition examples 1 to 7) and the heating loss (%), FIG. 15 is a graph showing the relationship between the mass percentage of the DOS to the whole quantity of the plasticizer and the EB decreasing rate (%), FIG. 16 is a graph showing the relationship between the mass percentage of the DOS to the whole quantity of the plasticizer and the modulus change rate (%), and FIG. 17 is a graph showing the relationship between the mass percentage of the DOS to the whole quantity of the plasticizer and the hardness change amount (%).

From FIGS. 14 to 17 and Tables 10 and 12, it is found that in the case of the rubber sheets of composition examples 1 to 7 where the mass percentage of the plasticizer to the whole quantity of the rubber portion composition is fixed to 5.3 mass %, when the mass percentage of the DOS to the whole quantity of the plasticizer is not more than 25 mass %, the change rates of the heating loss, the EB, the 100% modulus and the hardness are low. When the mass percentage exceeds 50 mass % and the mass percentage of the DOS to the whole quantity of the rubber portion composition exceeds 2.65 mass %, the change rates of the heating loss, the EB, the 100% modulus and the hardness start to increase. When the percentage of the DOS to the whole quantity of the rubber portion composition is not less than 4 mass % (the rubber sheets of composition examples 6 and 4), the EB decreases to an unusable value, so that the rubber is brittle. When the percentage of the DOS is not less than 4 mass %, the other physical properties also exhibit large decreases. That is, it is found that to obtain excellent heat resistance, the mass percentage of the DOS to the whole quantity of the rubber portion composition is necessarily less than 4 mass %. Preferably, the mass percentage of the DOS to the whole quantity of the rubber portion composition is not more than 2.65 mass %.

The mass percentage of the DOS to the whole quantity of the plasticizer is set to not more than 50 mass % (the mass part ratio of the DOS to the TMLA ester is not more than 1:1).

Figure 18:
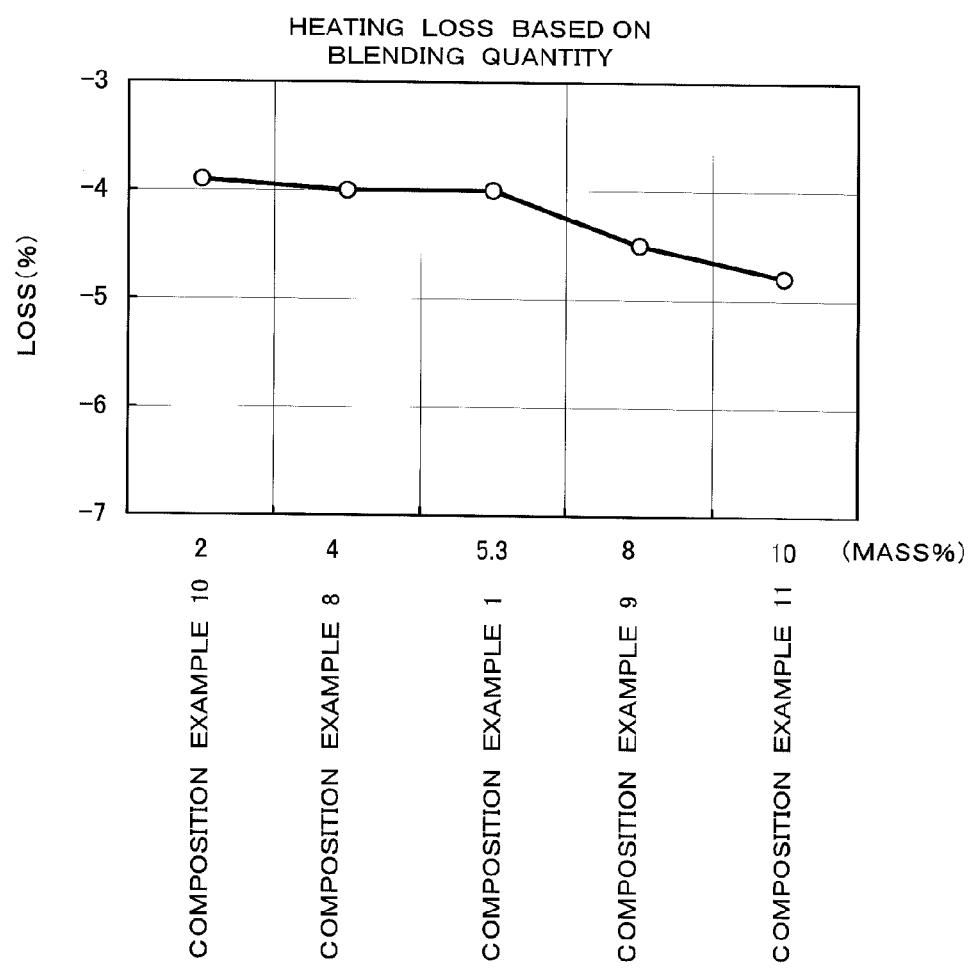
FIG. 18 is a graph showing the relationship between the mass percentage of the plasticizer to the whole quantity of the rubber portion composition and the heating loss (%)
Figure 19:
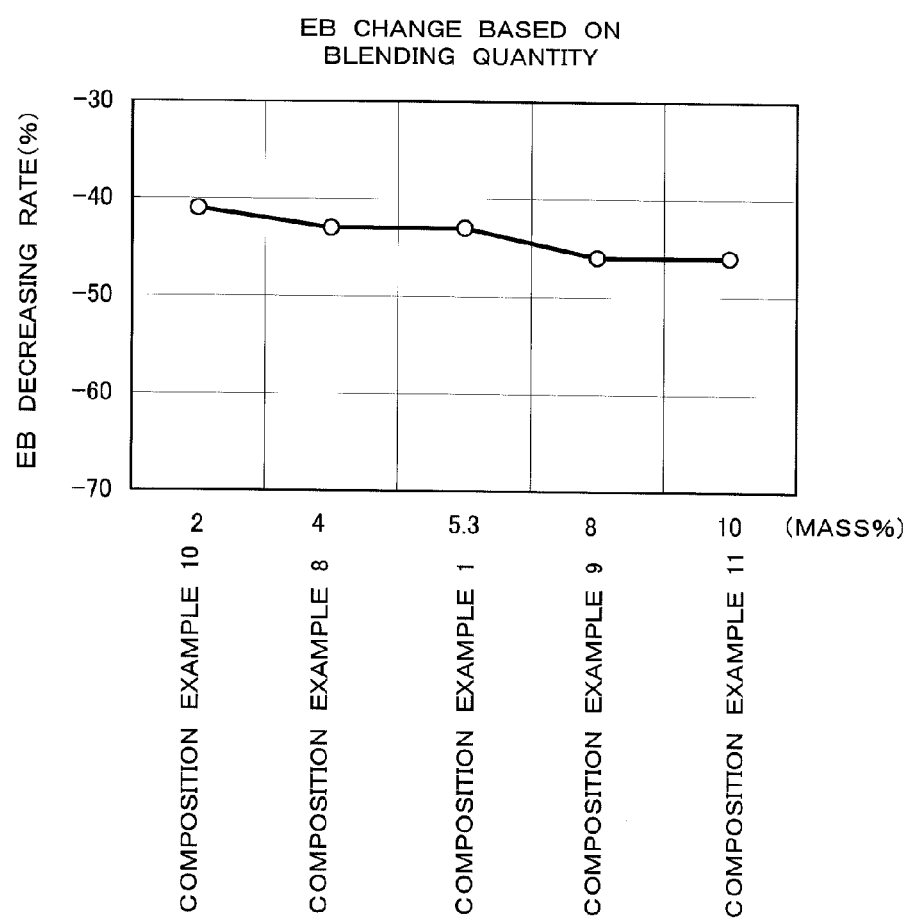
FIG. 19 is a graph showing the relationship between the mass percentage of the plasticizer to the whole quantity of the rubber portion composition and the EB decreasing rate (%)
Figure 21:
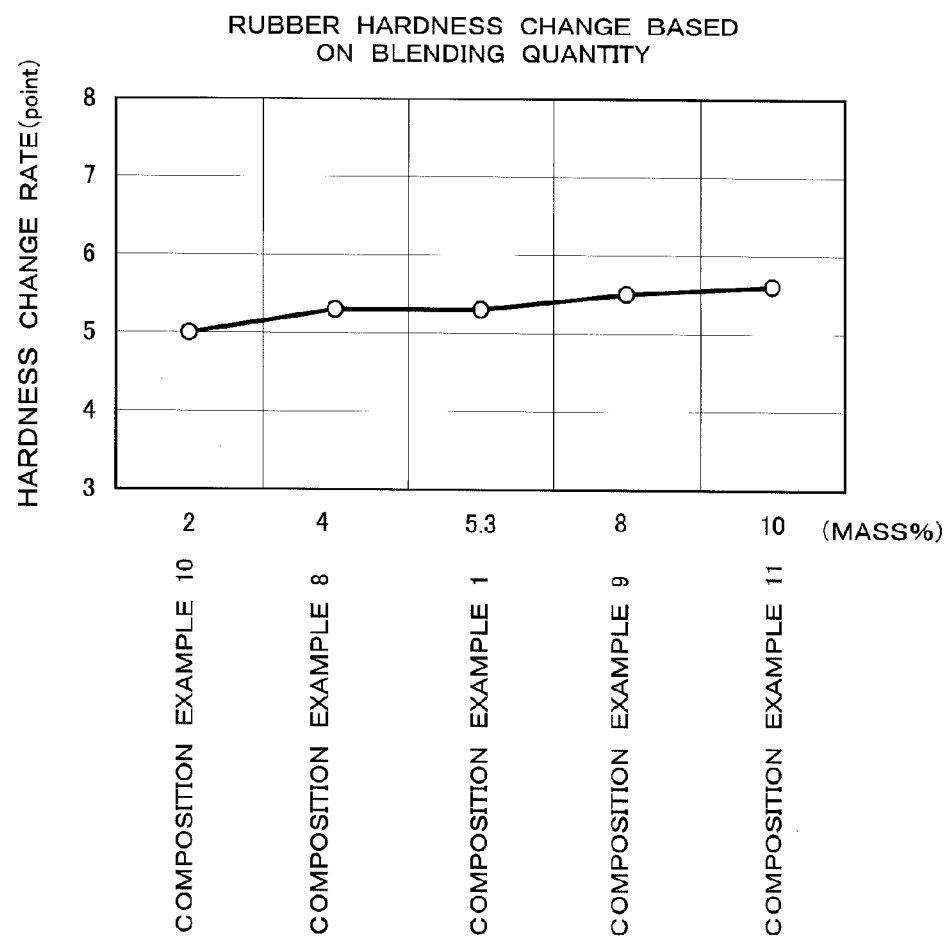
FIG. 21 is a graph showing the relationship between the mass percentage of the plasticizer to the whole quantity of the rubber portion composition and the hardness change rate (%)

FIG. 18 is a graph showing the relationship between the mass percentage of the plasticizer to the whole quantity of the rubber portion composition (corresponding to the rubber sheets of composition examples 1 and 8 to 11) and the heating loss (%), FIG. 19 is a graph showing the relationship between the mass percentage of the plasticizer to the whole quantity of the rubber portion composition and the EB decreasing rate (%), FIG. 20 is a graph showing the relationship between the mass percentage of the plasticizer to the whole quantity of the rubber portion composition and the modulus change rate (%), and FIG. 21 is a graph showing the relationship between the mass percentage of the plasticizer to the whole quantity of the rubber portion composition and the hardness change rate (%).

From FIGS. 18 to 21 and Tables 11 and 12, it is found that when the mass percentage of the plasticizer to the whole quantity of the rubber portion composition is higher than 8 mass %, the change rates of the physical quantities are high.

Therefore, the mass percentage of the plasticizer to the whole quantity of the rubber portion composition is set to not more than 8 mass %.

(3) Evaluation of Cold Resistance

Example 1

A toothed belt of example 1 was formed by using the rubber portion composition of composition example 1, using a nylon-66-made canvas having undergone the above-described treatment as the tooth cloth, joining the tooth cloth by the above-described joining method (welding angle was ten degrees) and using a carbon-made core wire having undergone the above-described treatment. The toothed belt had a tooth pitch of 3 mm, a length of 339 mm and a width of 15 mm.

Examples 2 to 5

Toothed belts of examples 2 to 5 were formed by a similar manner to that of example 1 except that the rubber portion compositions of composition examples 2, 3, 8 and 9 were used instead of the rubber portion composition of composition example 1.

Comparative Examples 1 to 6

Toothed belts of comparative examples 1 to 6 were formed by a similar manner to that of example 1 except that the rubber portion compositions of composition examples 4, 5, 6, 7, 10 and 11 were used instead of the rubber portion composition of composition example 1.

The relationships between examples 1 to 5 and comparative examples 1 to 6, and composition examples 1 to 11 are shown in Table 13 shown below.

Evaluation of Cold Resistance

The cold resistance of the toothed belts of examples 1 to 5 and comparative examples 1 to 6 was evaluated.

Figure 22:
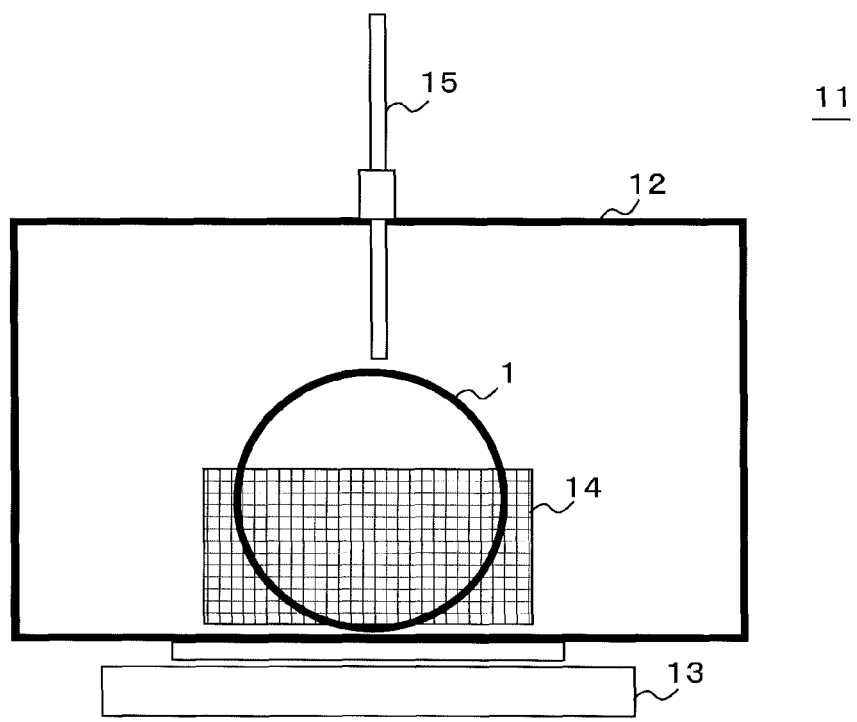
FIG. 22 is a schematic view showing a device for cold resistance evaluation.

FIG. 22 is a schematic view showing a device 11 for evaluating cold resistance and durability.

The device 11 has a cooling bath 12 made of foamed styrol, a scale 13 where the cooling bath 12 is placed, a support frame 14 supporting the toothed belt 1 in the cooling bath 12, and a synthetic-resin-made pressing rod 15 provided on the upper surface of the cooling bath 12 so as to be movable into and out of it.

The toothed belts were supported by the support frame 14, the pressing rod 15 was pressed in 70 mm from a point where the scale mark of the scale 13 moved in any direction, and the pressing load (g) when the toothed belt 1 was pressed was read. This pressing load (g) is the (belt) bending stiffness evaluation value. For each toothed belt, measurement was performed at three points, and the average value was calculated.

For each toothed belt, measurement was performed for each of in the case of room temperature, when cooling air was sent into the cooling bath 12 and the inside of the cooling bath 12 was held at −30 deg C. and when cooling air was sent into the cooling bath 12 and the inside of the cooling bath 12 was held at −40 deg C. Further, after a thermal history of 720 hours was provided at 140 deg C., measurement was performed for the above-mentioned three cases.

Figure 23:
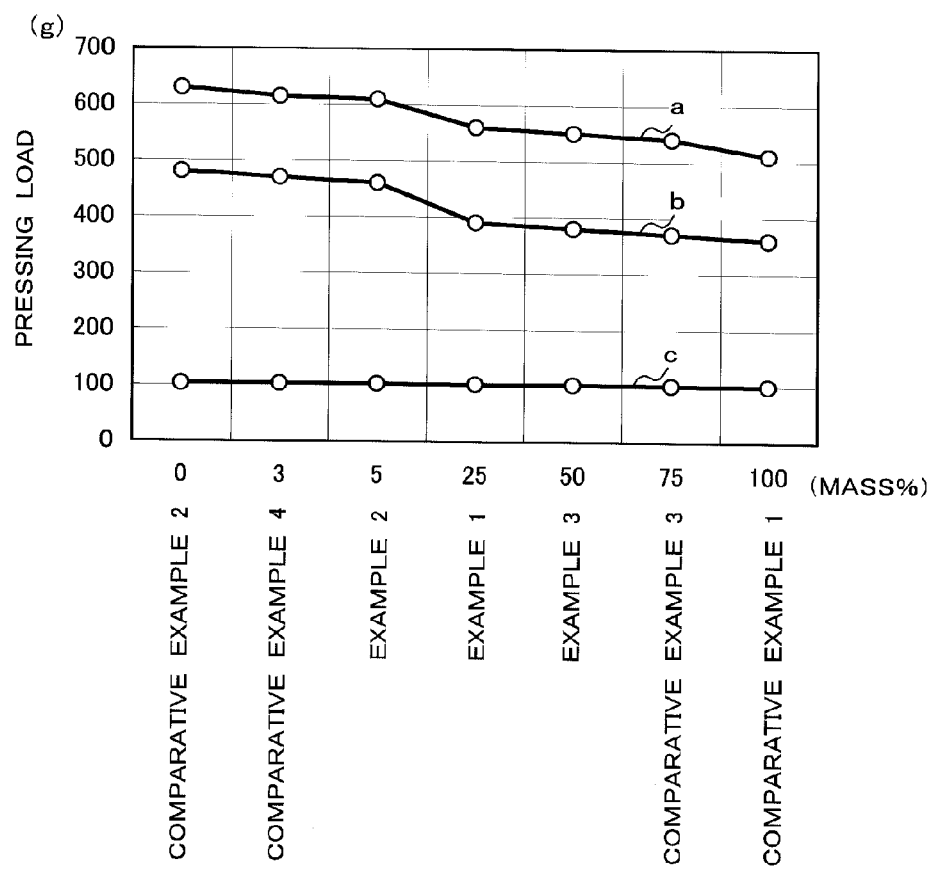
FIG. 23 is a graph showing the relationship between the mass percentage of the DOS to the whole mass of the plasticizer and the pressing load at each temperature when there is no thermal history.
Figure 24:
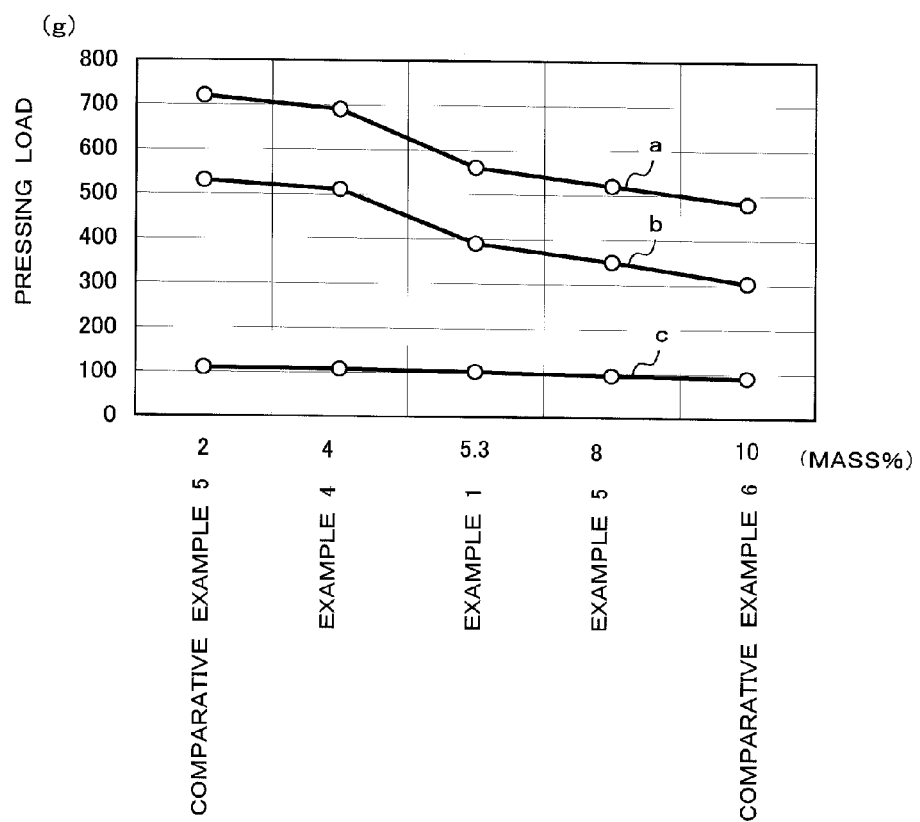
FIG. 24 is a graph showing the relationship between the mass percentage of the plasticizer to the whole quantity of the rubber portion composition and the pressing load at each temperature when there is no thermal history.

FIG. 23 is a graph showing the relationship between the mass percentage of the DOS to the whole quantity of the plasticizer (corresponding to examples 1 to 3 and comparative examples 1 to 4) and the pressing load at each temperature when there is no thermal history. FIG. 24 is a graph showing the relationship between the mass percentage of the plasticizer to the whole quantity of the rubber portion composition (corresponding to examples 1, 4 and 5 and comparative examples 5 and 6) and the pressing load at each temperature when there is no thermal history. In FIGS. 23 and 24, a, b and c represent the pressing loads when the inside of the cooling bath 12 was held at −40 deg C., at −30 deg C. and at room temperature, respectively.

From FIGS. 23 and 24, it is found that as the proportion of the DOS to the whole quantity of the plasticizer and the proportion of the plasticizer to the whole quantity of the rubber portion composition increase, that is, by setting the mass percentage of the DOS to the whole quantity of the plasticizer to not less than 5 mass % (the mass part ratio of the DOS to the TMLA ester is not less than 1:19) and setting the mass percentage of the plasticizer to the whole quantity of the rubber portion composition to not less than 4 mass %, flexibility under low temperature environment is excellent. And it is found that the belt bending stiffness at room temperature is not much influenced by the quantity of addition of the DOS and the total blending quantity of the plasticizer.

Figure 25:
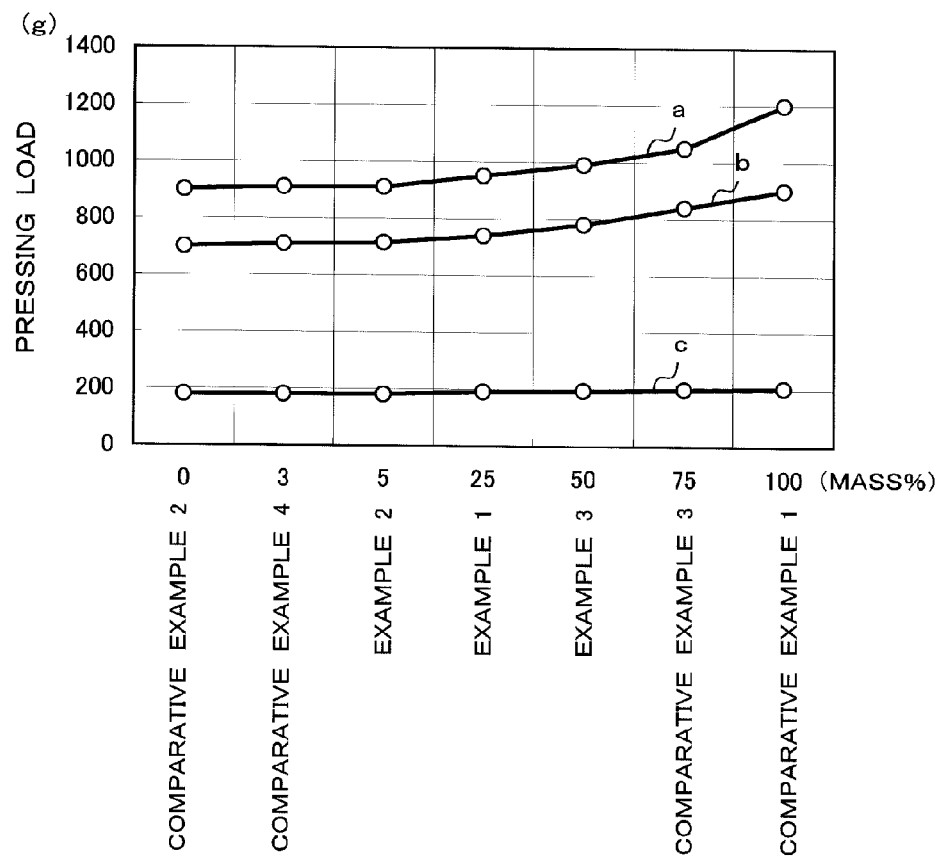
FIG. 25 is a graph showing the relationship between the mass percentage of the DOS to the whole mass of the plasticizer and the pressing load at each temperature when there is a thermal history.
Figure 26:
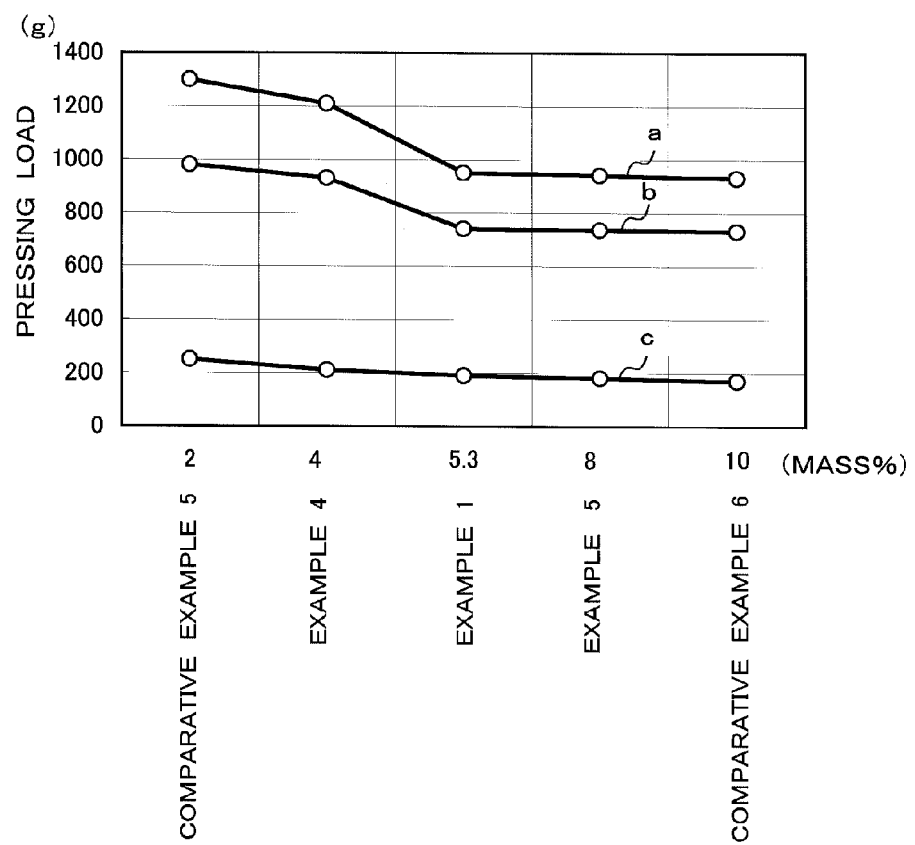
FIG. 26 is a graph showing the relationship between the mass percentage of the plasticizer to the whole quantity of the rubber portion composition and the pressing load at each temperature when there is a thermal history.

FIG. 25 is a graph showing the relationship between the mass percentage of the DOS to the whole quantity of the plasticizer (corresponding to examples 1 to 3 and comparative examples 1 to 4) and the pressing load at each temperature when there is a thermal history. FIG. 26 is a graph

TABLE 13

|  | EXAMPLE | | | | | COMPARATIVE EXAMPLE | | | | | |
| --- | --- | --- | --- | --- | --- | --- | --- | --- | --- | --- | --- |
|  | 1, 11 | 2, 12 | 3, 13 | 4, 14 | 5, 15 | 1, 11 | 2, 12 | 3, 13 | 4, 14 | 5, 15 | 6, 16 |
| COMPOSITION EXAMPLE | 1 | 2 | 3 | 8 | 9 | 4 | 5 | 6 | 7 | 10 | 11 | showing the relationship between the mass percentage of the plasticizer to the whole quantity of the rubber portion composition (corresponding to examples 1, 4 and 5 and comparative examples 5 and 6) and the pressing load at each temperature when there is a thermal history. In FIGS. 25 and 26, a, b and c represent the pressing loads when the inside of the cooling bath 12 was held at −40 deg C., at −30 deg C. and at room temperature, respectively.

From FIG. 25, it is found that the flexibility, under low temperature environment, of the toothed belt having a thermal history deteriorates as the proportion of the DOS to the whole quantity of the plasticizer increases. That is, although there is no difference when the mass percentage of the DOS to the whole quantity of the plasticizer is not more than 5 mass %, flexibility gradually deteriorates when the mass percentage exceeds 5 mass %. This is considered to be because the DOS acts to promote the heat aging of the rubber and because of the heat of 140 deg C., the DOS volatilizes to reduce the cold resistance effect by the DOS.

Therefore, the mass percentage of the DOS to the whole quantity of the plasticizer is set to not more than 50 mass %.

In the case of FIG. 26, unlike in the case of FIG. 25, flexibility does not deteriorate as the value of the mass percentage of the plasticizer to the whole quantity of the rubber portion composition increases after a thermal history. This is considered to be because in the case of FIG. 26, the quantity of addition of the DOS is as small as 0.5 to 2.5 mass % and the influence of the DOS is therefore small.

From FIG. 26, it is found that when the mass percentage of the plasticizer to the whole quantity of the rubber portion composition is not less than 4 mass %, bending stiffness (flexibility) improves and when the mass percentage is not less than 5.3 mass %, flexibility is uniform and more excellent.

By the evaluations of heat resistance and cold resistance, the mass percentage of the DOS to the whole quantity of the plasticizer is set to not less than 5 mass % and not more than 50 mass % (the mass part ratio of the DOS to the TMLA ester is not less than 1:19 and not more than 1:1); preferably, the mass percentage is set to not less than 25 mass % and not more than 50 mass % (the mass part ratio of the DOS to the TMLA ester is not less than 1:3 and not more than 1:1).

Moreover, the mass percentage of the DOS to the whole quantity of the rubber portion composition is set to less than 4 mass %. Preferably, the mass percentage is not more than 2.65 mass %.

Further, the mass percentage of the plasticizer to the whole quantity of the rubber portion composition is set to not less than 4 mass % and not more than 8 mass %. Preferably, the mass percentage is set to not less than 5.3 mass % and not more than 8 mass %.

Consequently, a toothed belt is obtained where belt hardening is small even when it is cold and reduction in transmission efficiency is small, and low fuel consumption and excellent transmission accuracy are obtained.

(4) Evaluation of Durability (Belt Bending Fatigue Performance)

Examples 11 to 15

Toothed belts of examples 11 to 15 were formed by similar manners to those of examples 1 to 5, respectively, except that the length of the toothed belt was 999 mm and the width thereof was 20 mm.

Comparative Examples 11 to 16

Toothed belts of comparative examples 11 to 16 were formed by similar manners to those of comparative examples 1 to 6, respectively, except that the length of the toothed belt was 999 mm and the width thereof was 20 mm.

The relationships between examples 11 to 15 and comparative examples 11 to 16, and composition examples 1 to 11 are shown in Table 13 shown above.

The durability (belt bending fatigue) of the toothed belts of examples 11 to 15 and comparative examples 11 to 16 was evaluated.

FIG. 27 is a schematic view showing a device 20 for durability evaluation.

The toothed belts were placed in a constant temperature bath 23 with the tooth portions thereof wound around four pulleys 21 and the back of the belt body thereof supported by four idlers 22. Hot air was supplied into the constant temperature bath 23 by a hot air generator 24, and the toothed belts were run at a temperature of 110 deg C. in the constant temperature bath 23.

Figure 28:
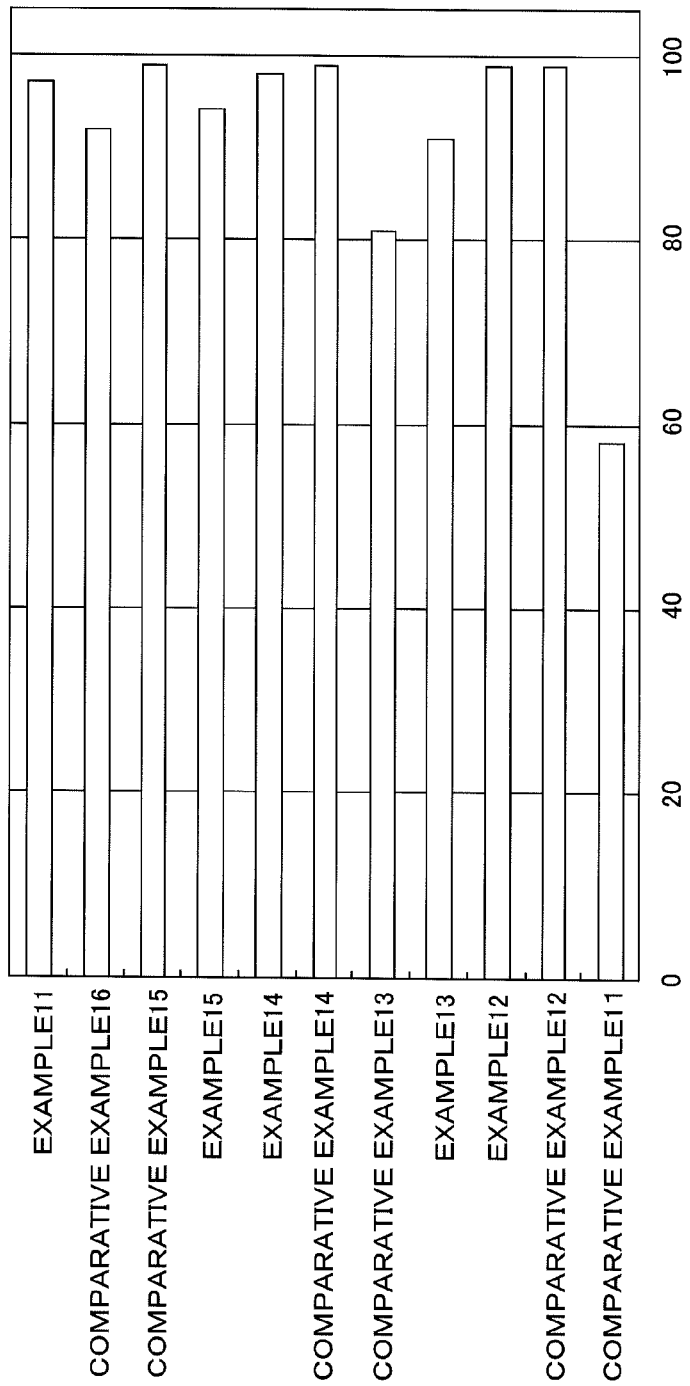
FIG. 28 is a graph showing the results of comparison of the residual strength after the elapse of 500 hours.

The test conditions were as follows:
Load: 147 N
Rotation speed: 5500 r/m
Pulley: 3 mm in tooth pitch, 33 in the number of pulley teeth
Idler size: 45 mm in diameter
Test time: 500 hours FIG. 28 is a graph showing the results of comparison of the residual strength after the elapse of 500 hours (represented as the proportion when the tensile strength before the test is 100).

Since the belt temperature itself is approximately 110 deg C., influence by the rubber hardening is small. When the mass percentage of the plasticizer to the whole quantity of the rubber portion composition is the same value of 5.3 mass %, reduction in strength increases as the proportion of the DOS in the plasticizer increases (strength gradually decreases in the order of comparative example 12, comparative example 14, example 12, example 11, example 13, comparative example 13 and comparative example 11). That is, when the mass percentage of the DOS to the whole quantity of the rubber portion composition is not less than 4 mass %, strength is significantly low, and the strength of comparative example 11 the mass percentage of which is higher than 5 mass % is the lowest. This is considered to be because the DOS affects the core wire treatment agent and the treatment agent softens so that the core material protective effect of the treatment agent is lost.

From the above, the mass percentage of the DOS to the whole quantity of the rubber portion composition is set to less than 4 mass %, and the mass percentage of the DOS to the whole quantity of the plasticizer is set to not more than 50 mass %.

(5) Evaluation of High Load Resistance

The dynamic tooth jumping torque of the toothed belts of examples 11 to 15 and comparative examples 11 to 16 was measured, and high load resistance was evaluated.

Figure 29:
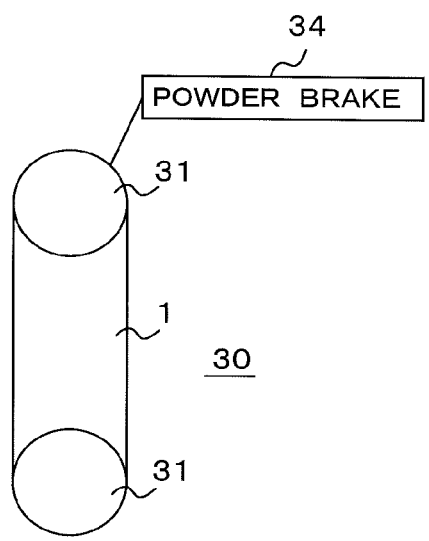
FIG. 29 is a schematic view showing a device for measuring the dynamic tooth jumping torque of toothed belts.

FIG. 29 is a schematic view showing a device 30 for measuring the dynamic tooth jumping torque of the toothed belts.

The toothed belts 1 were wound around pulleys 31, torque was transmitted to the driven pulley 31 by a power brake 34, and the torque values of the driven pulley 31 at the moment when the toothed belt 1 climbed over the pulley 31 to cause tooth jumping were compared.

Figure 30:
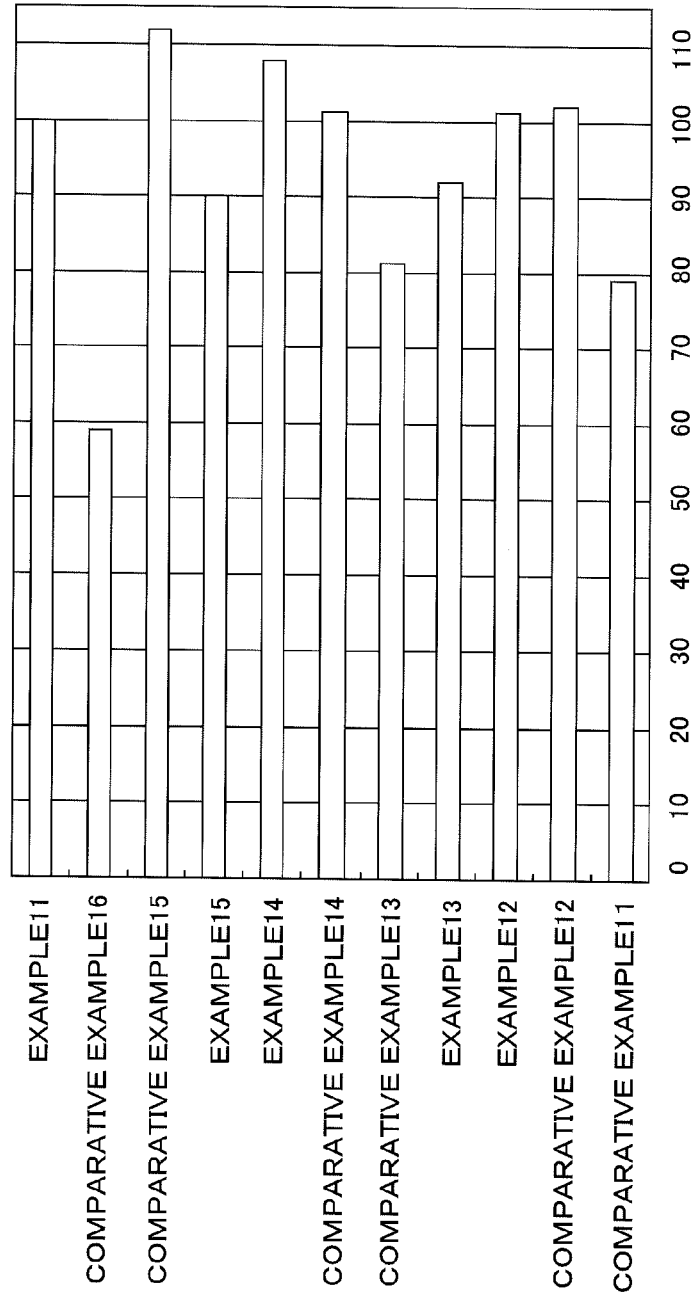
FIG. 30 is a graph showing the dynamic tooth jumping torques of the toothed belts.

The test conditions were as follows:
Rotation speed: 1000 r/m
Pulley: 3 mm in tooth pitch, 33 in the number of pulley teeth FIG. 30 is a graph showing the dynamic tooth jumping torques of the toothed belts of examples 11 to 15 and comparative examples 11 to 16. In FIG. 30, the dynamic tooth jumping torque is represented as a relative value when that of example 11 is 100.

The value of comparative example 16 where the mass percentage of the plasticizer to the whole quantity of the rubber portion composition was the highest was the lowest, and the value of comparative example 15 where the mass percentage was the lowest was the highest. Between comparative example 11 and comparative example 12 the mass percentages of which were the same, the value of comparative example 12 containing no DOS was higher. That is, when the mass percentage of the plasticizer to the whole quantity of the rubber portion composition is the same value of 5.3 mass %, the torque value when tooth jumping occurs decreases as the proportion of the DOS in the plasticizer increases (the torque value gradually decreases in the order of comparative example 2, comparative example 4, example 2, example 1, example 3, comparative example 3 and comparative example 1).

From the above, the mass percentage of the plasticizer to the whole quantity of the rubber portion composition is set to not more than 8 mass %, and the mass percentage of the DOS to the whole quantity of the plasticizer is set to not more than 50 mass %.

By the evaluations of heat resistance, cold resistance, belt bending fatigue performance and high load resistance, it is found that by setting the mass part ratio of the DOS to the TMLA ester from 1:19 to 1:1, setting the mass percentage of the DOS to the whole quantity of the rubber portion composition to less than 4% and setting the mass percentage of the total quantity of the plasticizer including the DOS and the TMLA ester to the whole quantity of the rubber portion composition from 4 mass % to 8 mass %, a toothed belt is obtained that has a good balance of environment resistance such as heat resistance, cold resistance and bending fatigue resistance and is excellent in stiffness and high load resistance. Preferably, the mass part ratio of the DOS to the TMLA ester is in a range from 1:3 to 1:1. Preferably, the mass percentage of the DOS to the whole quantity of the rubber portion composition is not more than 2.65%. Preferably, the mass percentage of the total quantity of the plasticizer to the whole quantity of the rubber portion composition is in a range from 5.3 mass % to 8 mass %.

The toothed belt of the present invention has, as a small pitch toothed belt for uses in vehicles, high stiffness (tensile stiffness) and belt tooth stiffness, is capable of realizing high accuracy, and is capable of realizing compactness, light weight and low noise.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A toothed belt, comprising:
   a belt body formed of a rubber portion containing hydrogenated nitrile rubber and a polymer alloy formed by dispersing zinc methacrylate in the hydrogenated nitrile rubber, and in which a plurality of core wires are embedded;
   a tooth rubber portion more than one of which is juxtaposed on at least one surface of the belt body; and
   a tooth cloth portion formed by impregnating a cloth with a rubber composition containing hydrogenated nitrile rubber, and covering the tooth rubber portion,
   wherein the rubber portion contains dioctyl sebacate and trimellitic acid ester in a mass part ratio of 1:19 to 1:1, a mass percentage of the dioctyl sebacate to a whole quantity of the rubber portion is less than 4 mass %, and a mass percentage of a total quantity of the dioctyl sebacate and the trimellitic acid ester to the whole quantity of the rubber portion is in a range from 4 mass % to 8 mass %.

2. The toothed belt according to claim 1, wherein in the hydrogenated nitrile rubber containing the hydrogenated nitrile rubber as a base polymer of the polymer alloy, a quantity of bound acrylonitrile is not more than 19 mass %, an iodine value is not more than 15 mg/100 mg, a Mooney viscosity at 100 deg C. is not less than 60, and a mass percentage of the hydrogenated nitrile rubber to the whole quantity of the rubber portion is in a range from 15 mass % to 50 mass %.

3. The toothed belt according to claim 1, wherein the rubber portion contains a hydrogenated nitrile rubber whose Mooney viscosity at 100 deg C. is not less than 100, in a range from 3 mass % to 20 mass % to the whole quantity of the rubber portion.

4. The toothed belt according to claim 1, wherein the rubber portion contains sulfur and a sulfenamide vulcanization accelerator in a mass part ratio of 1:10 to 1:2, and a mass percentage of a total quantity of the sulfur and the sulfenamide vulcanization accelerator to the whole quantity of the rubber portion is in a range from 0.3 mass % to 1 mass %.

5. The toothed belt according to claim 2, wherein the rubber portion contains sulfur and a sulfenamide vulcanization accelerator in a mass part ratio of 1:10 to 1:2, and a mass percentage of a total quantity of the sulfur and the sulfenamide vulcanization accelerator to the whole quantity of the rubber portion is in a range from 0.3 mass % to 1 mass %.

6. The toothed belt according to claim 3, wherein the rubber portion contains sulfur and a sulfenamide vulcanization accelerator in a mass part ratio of 1:10 to 1:2, and a mass percentage of a total quantity of the sulfur and the sulfenamide vulcanization accelerator to the whole quantity of the rubber portion is in a range from 0.3 mass % to 1 mass %.

7. The toothed belt according to claim 1, wherein the rubber portion contains organic peroxide and a co-cross-linking agent in a mass part ratio of 4:1 to 20:1, and a mass percentage of a total quantity of the organic peroxide and the co-cross-linking agent to the whole quantity of the rubber portion is in a range from 4 mass % to 8 mass %.

8. The toothed belt according to claim 4, wherein the rubber portion contains organic peroxide and a co-cross-linking agent in a mass part ratio of 4:1 to 20:1, and a mass percentage of a total quantity of the organic peroxide and the co-cross-linking agent to the whole quantity of the rubber portion is in a range from 4 mass % to 8 mass %.

9. The toothed belt according to claim 1, wherein the rubber portion contains a carbon black with an average particle size of not more than 70 nm in a proportion of more than 0 mass % and not more than 20 mass % to the whole quantity of the rubber portion.

10. The toothed belt according to claim 4, wherein the rubber portion contains a carbon black with an average particle size of not more than 70 nm in a proportion of more than 0 mass % and not more than 20 mass % to the whole quantity of the rubber portion.

11. The toothed belt according to claim 1, wherein the rubber portion contains silicon dioxide in a range from 2 mass % to 5 mass % to the whole quantity of the rubber portion.

12. The toothed belt according to claim 4, wherein the rubber portion contains silicon dioxide in a range from 2 mass % to 5 mass % to the whole quantity of the rubber portion.

13. The toothed belt according to claim 1, wherein the rubber portion contains wax in a range from 0.3 mass % to 2 mass % to the whole quantity of the rubber portion.

14. The toothed belt according to claim 4, wherein the rubber portion contains wax in a range from 0.3 mass % to 2 mass % to the whole quantity of the rubber portion.

15. The toothed belt according to claim 1, wherein a woof index value of the cloth is not less than 370000, a total index value of the cloth is not more than 930000, and an index value ratio of the cloth is in a range from 70% to 130%, where the woof index value=a yarn size (dtex)×a number of twist×a number of filaments×a thread count per inch, a warp index value=a yarn size (dtex)×a number of twist×a number of filaments×a thread count per inch, the index value ratio=the woof index value/the warp index value (%), and the total index value=the woof index value+the warp index value.

16. The toothed belt according to claim 15, wherein a lateral tensile strength of the cloth is not less than 500 N/3 cm, and
a proportion of an area of the tooth rubber portion to a total area of the tooth rubber portion and the tooth cloth portion viewed from a belt width direction is not less than 45%.

17. The toothed belt according to claim 4, wherein a woof index value of the cloth is not less than 370000, a total index value of the cloth is not more than 930000, and an index value ratio of the cloth is in a range from 70% to 130%, where the woof index value=a yarn size (dtex)×a number of twist×a number of filaments×a thread count per inch, a warp index value=a yarn size (dtex)×a number of twist×a number of filaments×a thread count per inch, the index value ratio=the woof index value/the warp index value (%), and the total index value=the woof index value+the warp index value.

18. The toothed belt according to claim 1, wherein the rubber composition with which the cloth is impregnated contains the following: hydrogenated nitrile rubber; epichlorohydrin rubber formed of a copolymer of epichlorohydrin and ethylene oxide or a ternary copolymer where allylglycidylether is copolymerized as a third component and an allyl group is introduced into a polymer main chain in a pendant form; hydrogenated carboxylic nitrile rubber; hydrophobic silica; blocked isocyanate; and phenolic resin.

19. The toothed belt according to claim 1, wherein the core wire is formed by impregnating a carbon fiber with a treatment agent containing hydrogenated nitrile rubber, a zirconic coupling agent, hydrophobic silica, phenolic resin and potassium titanate, and drying them.

20. The toothed belt according to claim 1, wherein the tooth cloth portion is formed so that a junction is at an angle of five degrees to 15 degrees to the belt width direction.

* * * * *